United States Patent [19]
Bilgic et al.

[11] Patent Number: 5,884,148
[45] Date of Patent: Mar. 16, 1999

[54] WIRELESS LOCAL LOOP SYSTEM AND METHOD

[75] Inventors: Murat I. Bilgic; Narayan P. Menon, both of Colorado Springs, Colo.

[73] Assignee: Omnipoint Corporation, Colorado Springs, Colo.

[21] Appl. No.: 676,975

[22] Filed: Jul. 8, 1996

[51] Int. Cl.⁶ .................................................. H04M 11/00
[52] U.S. Cl. .......................... 455/74.1; 455/404; 455/561
[58] Field of Search .................................. 455/74, 1, 403, 455/422, 404, 426, 557, 561, 564, 554, 556, 450, 462, 465, 445, 11.1

[56] References Cited

U.S. PATENT DOCUMENTS

| | | | |
|---|---|---|---|
| 3,711,647 | 1/1973 | Boyer | 179/2 |
| 3,856,982 | 12/1974 | Lawson et al. | 179/90 |
| 3,912,875 | 10/1975 | Katz | 179/41 |
| 3,974,343 | 8/1976 | Cheney et al. | 179/18 |
| 4,005,269 | 1/1977 | Willis | 179/2 C |
| 4,012,596 | 3/1977 | West, Jr. et al. | 179/41 |
| 4,028,500 | 6/1977 | McClure et al. | 179/41 |
| 4,071,711 | 1/1978 | Beaupre et al. | 179/41 |
| 4,122,304 | 10/1978 | Mallien, II | 179/2 |
| 4,176,254 | 11/1979 | Tuttle | 179/5 R |
| 4,234,764 | 11/1980 | Beebe | 179/90 |
| 4,369,516 | 1/1983 | Byrns | 375/110 |
| 4,425,480 | 1/1984 | Lischin | 179/90 |
| 4,555,592 | 11/1985 | Deinzer | 179/2 |
| 4,562,307 | 12/1985 | Bursztejn et al. | 179/2 |
| 4,567,588 | 1/1986 | Jerrim | 370/18 |
| 4,568,800 | 2/1986 | Orikasa | 179/2 |
| 4,577,182 | 3/1986 | Millsap et al. | 340/539 |
| 4,601,047 | 7/1986 | Horwitz et al. | 375/2.2 |
| 4,635,285 | 1/1987 | Coombes | 379/63 |
| 4,658,096 | 4/1987 | West, Jr. et al. | 379/59 |
| 4,658,304 | 4/1987 | Tsunekawa et al. | 358/310 |
| 4,677,656 | 6/1987 | Burke et al. | 379/63 |
| 4,688,210 | 8/1987 | Eizenhofer et al. | 370/18 |

(List continued on next page.)

OTHER PUBLICATIONS

Telular Prospectus, Jan. 27, 1994.

Indoor Radio Communications Using Time–Division Multiple Access with Cyclical Slow Frequency Hopping and Coding, Adel A.M. Saleh, Leonard J. Cimini, Jr. IEEE Journal on Selected Areas in Communications, vol. 7. No. 1, Jan. 1989, pp. 59–70.

Universal Digital Portable Radio Communications, Donald C. Cox, Proceedings of the IEEE, vol. 75, No. 4, Apr. 1987.

E.F. Johnston, 1154 Cellular Mobile Transceiver Service Manual; Jun. 1985.

Glenayre, GL2020 Mobile Telephone Operating Instructions; Glenayre Electronics (Applicant believes that the date of publication is prior to Jul., 1995).

(List continued on next page.)

*Primary Examiner*—Dwayne Bost
*Assistant Examiner*—Brian L Johnson
*Attorney, Agent, or Firm*—Lyon & Lyon LLP

[57] ABSTRACT

A system and method for setting up a telephone call over a communication path having at least one wireless communication link comprises a universal radio converter (URC) connected to a standard non-wireless device by way of a standard analog interface over which DTMF tone signals are transmitted. Upon receiving the first tone signal, the URC establishes a wireless communication link with a base station. After the communication link is established, the URC transmits to the base station the dialed numbers as they are received from the standard non-wireless device. The base station performs digit analysis as the dialed numbers are received according to a local call numbering format, and sends a call setup request message to the network. A preferred URC is equipped with means to detect an emergency call request, such as a "911" call, upon which the URC establishes a wireless communication link over an emergency call channel. The invention is illustrated in one embodiment with respect to a preferred TDMA over-the-air protocol.

31 Claims, 16 Drawing Sheets

U.S. PATENT DOCUMENTS

| | | |
|---|---|---|
| 4,724,435 | 2/1988 | Moses et al. .......................... 340/870 |
| 4,724,538 | 2/1988 | Farrell ..................................... 379/59 |
| 4,737,975 | 4/1988 | Shafer ..................................... 379/58 |
| 4,765,753 | 8/1988 | Schmidt .................................. 379/60 |
| 4,775,997 | 10/1988 | West, Jr. et al. ......................... 379/58 |
| 4,868,519 | 9/1989 | Shafer ................................... 330/284 |
| 4,922,517 | 5/1990 | West, Jr. et al. ......................... 379/58 |
| 4,937,852 | 6/1990 | Manzarek ................................ 379/61 |
| 4,959,851 | 9/1990 | Tobolski, Jr. ............................ 379/59 |
| 4,975,926 | 12/1990 | Knapp ...................................... 375/1 |
| 4,984,247 | 1/1991 | Kaufmann et al. ........................ 375/1 |
| 5,046,066 | 9/1991 | Messenger .............................. 370/4.1 |
| 5,099,493 | 3/1992 | Zeger et al. ............................... 375/1 |
| 5,117,450 | 5/1992 | Joglekar et al. ......................... 379/58 |
| 5,134,651 | 7/1992 | Ortiz et al. .............................. 379/112 |
| 5,151,920 | 9/1992 | Haagh et al. ............................. 375/1 |
| 5,200,956 | 4/1993 | Pudney et al. ........................... 370/95 |
| 5,206,881 | 4/1993 | Messenger et al. ........................ 375/1 |
| 5,231,646 | 7/1993 | Heath et al. ............................... 375/1 |
| 5,243,641 | 9/1993 | Evans et al. .............................. 379/61 |
| 5,260,967 | 11/1993 | Schilling ................................... 175/1 |
| 5,276,703 | 1/1994 | Budin et al. .............................. 375/1 |
| 5,285,469 | 2/1994 | Vanderpool ............................... 375/1 |
| 5,303,286 | 4/1994 | Wiedeman ................................ 379/59 |
| 5,303,287 | 4/1994 | Laborde ................................... 379/59 |
| 5,319,634 | 6/1994 | Bartholomew et al. ................. 370/18 |
| 5,337,342 | 8/1994 | Kruger ..................................... 379/58 |
| 5,343,496 | 8/1994 | Honig et al. ............................... 375/1 |
| 5,361,297 | 11/1994 | Ortiz et al. .............................. 379/130 |
| 5,428,821 | 6/1995 | Krisna ................................... 455/54.1 |
| 5,467,637 | 11/1995 | Izumi et al. ............................ 375/206 |
| 5,475,735 | 12/1995 | Williams .................................. 379/59 |
| 5,481,533 | 1/1996 | Honig et al. ............................. 370/18 |
| 5,488,631 | 1/1996 | Gold et al. .............................. 375/206 |
| 5,506,837 | 4/1996 | Sollner et al. ........................... 370/31 |
| 5,535,260 | 7/1996 | Zicker ...................................... 379/59 |
| 5,537,458 | 7/1996 | Suomi et al. ............................. 379/59 |
| 5,548,583 | 8/1996 | Bustamante .............................. 379/63 |
| 5,577,029 | 11/1996 | Lu ............................................ 379/59 |
| 5,596,625 | 1/1997 | LeBlanc ................................... 379/59 |

OTHER PUBLICATIONS

Fixed Subscriber Radio Systems at V.H.F. and U.H.F., Radio & Elec. Eng. Australia, A.J.Edwards, Dec. 1972.

"Notes on the Network" by AT&T Network Planning Division Fundamental Network Planning Section, AT&T, 1980.

"90935/36 Remote and Master Telephone/Radio Interface Modules", Installation & Maintenance Practice, Dantel, Inc., 1981.

"Cellnet adds data to celular service" International News, Telephone Engineer & Management, Nov. 1, 1985.

"Celldata launched", British Telecom Journal, No. 3, (1985) vol. 6, Autumn.

"Low Bit–Rate Speech Coders Applicable in Mobile Satellite Communication systems", Neviano Dal Degan and Fulvio Rusina, CSELT—Centrol Studie Laboratori Telecommunication S.p.A.–Via G. Reiss Rom oli, 274—10148 Torino (Italy) (Applicant believes that the date of publication is prior to Jul., 1995).

Radio Subscriber System, NEC Res. Develop. (Japan) T.Miyawaki, M.Tanaka, H.Orikasa, I.Hotta, Apr. 1979.

"Radio Linked Exchange and Concentrator Rural Telephone System" (RTS) 1975.

An Automatic, Fully Interconnected HF Radio Telephone System, E.W. Derbyshire, Canadian Marconi Company, Montreal, Canada (Applicant believes that the date of publication is prior to Jul., 1995).

GM's Hughes Unit is said to Receive China Phone Job, Wall Street Journal Article, Jeff Cole, Apr. 13, 1993.

EXLOCRA: Local Extension by Radio, Francois P.M. Grandchamp, Telecommunications Journal, Aug. 1982.

Design of a Multiple Access Radio System for Rural Telephony, A.Golderos Sanchez, Telecommunications Journal, Nov. 1983.

Subscriber Radio Telephone System for Rural Areas, M.Komura, T.Miyagawa, Y.Suzuki, J.Uehara, Japanese Telecommunications Journal, Apr. 1976.

Cellular Radio Telephony; Ericsson Review, 1987.

System Description; Nordic Mobile Telephone, 1977.

Technical Manual; Canadian Marconi Company, Nov. 22, 1984.

User's Guide for AT&T 3730/3710 or OKI 900/910 Portable Cellular Telephones; Cellular/Data Link, 1993.

New Rural Radiotelephone Brings Normal Service to Near–Impossible Areas, John W. Hagen, Telephony. Sep. 1975.

The Problem of Radio Telephone Systems for Rural Subscribers; F.Barresi, D.Ongaro, M.Saba, S.Urbano, I.C.C., Jun. 1978.

Ericsson Radio Systems, "PayPhone", Dec. 19, 1984, Rev. A.

Ericsson Radio Systems, "Coinbox–Interface", Dec. 19, 1984, Rev. A.

Ericsson Radio Systems, "Radio Interface", Dec. 20, 1984, Rev. A.

Ericsson Radio Systems, "Payphone", Dec. 20, 1984, Rev. A.

Ericsson Radio Systems, "Coinbox–Interface", Dec. 20, 1984.

Valtion Teknillinen Tutkimuskeskus documentation of prototype for NMT coin telephone adapter dated Apr. 30, 1983 and English translation.

Description of Automatic Coastal Radio Network (ARRV) and English Translation (Applicant believes that the date of publication is prior to Jul., 1995).

Valtion Teknillinen Tutkimuskeskus press release of successful trial of Valtion Teknillinen Tutkimuskeskus developed adaptor for connecting coin telephone to NMT, (Applicant believes that the date of publication is prior to Jul., 1995) and English Translation.

Copy of minutes of Valtion Teknillinen Tutkimuskeskus confirming completion of project to develop a prototype to test feasibility of wireless NMT coin telephone service dated Jun. 27, 1983 and English Translation.

Copy of PTT request for proposal for wireless NMT coin telephone service and English translation, dated Apr. 19, 1982.

PTT purchase order accepting Valtion Teknillinen Tutkimuskeskus proposal set forth in their proposal dated Jun. 18, 1982 and English translation.

Valtion Teknillinen Tutkimuskeskus proposal for developing adaptor for coin telephone connection to NMT system dated May 17, 1982 and English Translation.

PTT press release of successful trial of Valtion Teknillinen Tutkimuskeskus developed adaptor for connecting coin telephone to NMT dated May 13, 1983.

PTT memo on proposal implementation of NMT coin telephone system dated Apr. 3, 1981 in Finnish language and English Translation.

Copy of letter from Valtion Teknillinen Tutkimuskeskus to PTT confirming acceptance of proposal dated Aug. 4, 1982 and English Translation.

Original PTT project specification for wireless NMT coin telephone service (3 versions) Nov. 9, 1981, Sep. 6, 1983 and Jan. 15, 1985.

"Air Interface Considerations," Joint Experts Meeting, Rockwell Int'l. Nov. 9, 1992.

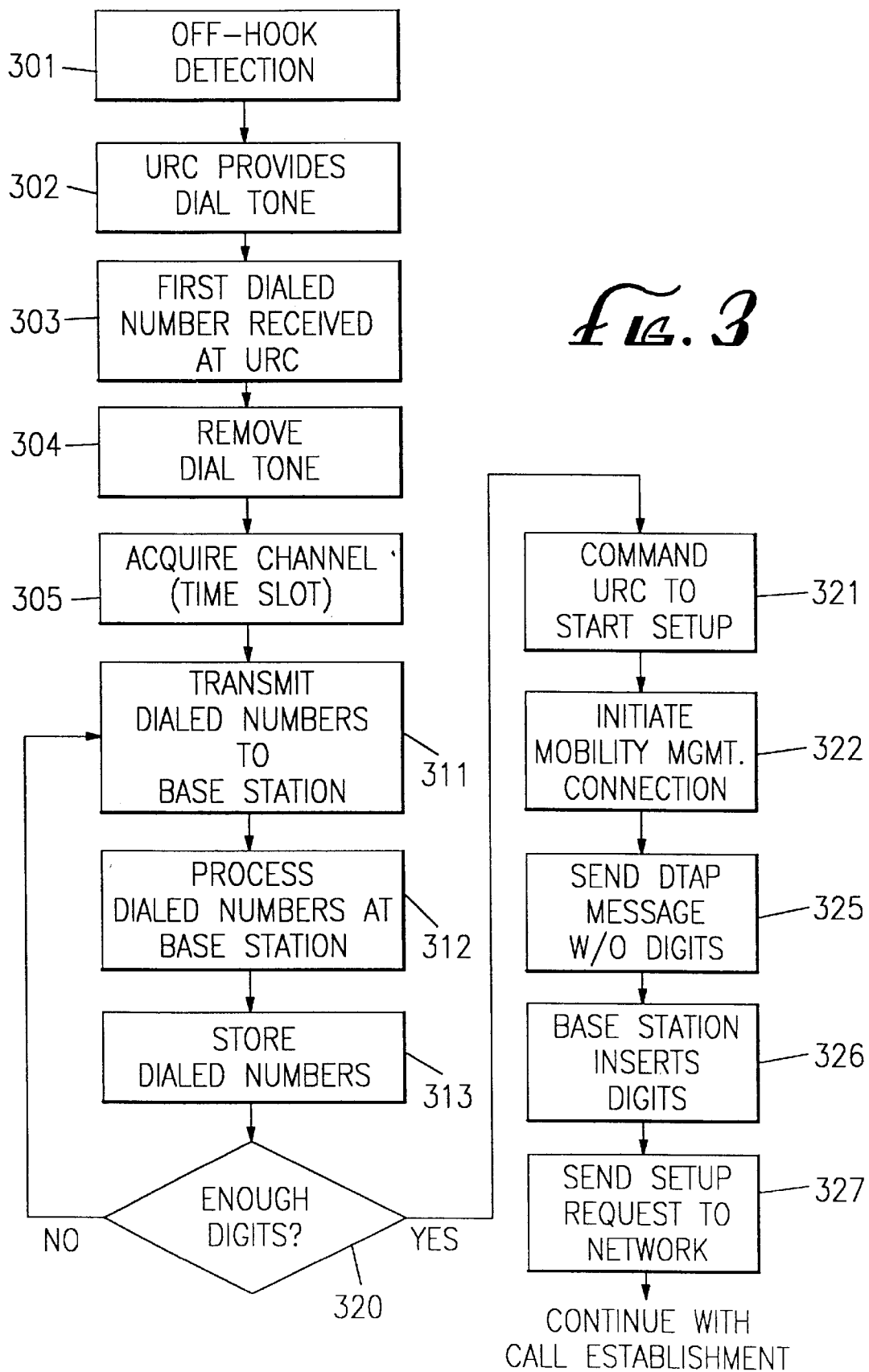

DIAL TONE, TRANSMISSION OF ADDRESS DIGITS AND CALL SETUP WITH PSTN INTERWORKING

UNIVERSAL RADIO CONVERTER (URC)

EMERGENCY CALL PROCESSING

CALL PROCESS FOR NON-EMERGENCY CALL
(NO NORMAL CHANNELS AVAILABLE)

WIRELESS LOCAL LOOP SYSTEM AND METHOD

BACKGROUND OF THE INVENTION

1) Field of the Invention

The field of the invention pertains to communications including more particularly, to a system and method for connecting a user device to a network over a communication path including at least one wireless communication link.

2) Background

A proliferation of wireless communication systems in recent years has led to an increase in available communication resources and alternative access routes to public networks. A significant advantage provided by wireless communication systems over landline based systems is ease in deployment, allowing a wireless unit to be placed at remote locations without having to undertake the expense and inconvenience of physically connecting the remote locations with telephone lines, cable, fiber optic lines, or other communication lines.

While the proliferation of wireless communication systems has generally led to an increase in total available communication resources, it has also become apparent that many end users do not have access to the wireless communication resources. For example, most standard telephones, fax machines, set top boxes and computers are generally not equipped for wireless communication. The primary alternative to wireless access is landline access, which can be costly to install. Also, an end user may be given only one choice of provider when using landline service. A need therefore exists for connecting end users with standard non-wireless telecommunications devices with wireless communication resources, to provide alternative communication paths to public networks, at a relatively economical cost and to increase flexibility of provider selection.

Known wireless local loop systems typically include a wireless communication path for connecting an end user to a network by way of a wireless base station (e.g., a cellular base station). In one known type of wireless local loop system, end users using standard non-wireless communication devices connect through an interface unit. The interface unit processes outgoing and incoming calls between the base station and the standard non-wireless communication devices so that the end user can communicate over the wireless channel.

A particular problem faced in establishing a communication path between an end user using a standard non-wireless communication device and a wireless base station is the call initiation process. A known method for call initiation over a particular interface between telephone handsets and a cellular system is described, for example, in U.S. Pat. No. 4,658,096. The interface described in U.S. Pat. No. 4,658,096 includes a cellular radio transceiver connected to the end user device, and means for converting touch tone or pulse dialed numerals or digits to digital data for transmission by a transceiver connected to the interface. As each digit is dialed at the end user device, the signals are converted to digital data and stored in the interface unit. The interface unit performs digit analysis to determine the number of digits being dialed. Based upon its digit analysis, it determines when the last digit in the number being dialed has been dialed and after determining that the last digit has been dialed, causes a "send" signal to be sent to the transceiver to transmit the stored digits to the base station. The transceiver transmits the dialed number over a wireless channel to a base station for use by the local telephone central control office in completing the call.

The above described technique has a particular disadvantage in that it does not provide flexibility in the digit analysis which can easily accommodate changes in numbering schemes. Further, this interface unit requires that the telephone numbering algorithms of the ultimate locale where the interface unit will be used be programmed into the interface unit. As an example, different countries have different numbering formats for the initiation of phone calls. Thus, an interface unit that operates in one country according to the numbering scheme of that country will not necessarily operate properly in another country with a different numbering scheme. While the interface unit can be modified for each different locality so as to be compatible with the different numbering scheme, doing so could entail reprogramming or other revisions when the interface unit is switched between localities, and also could prevent the manufacture of a uniform interface unit that is operable in all different localities, regardless of the numbering scheme employed in the locality where the interface unit is deployed.

More importantly, however, is the difficulty that is expected to be caused due to growth in the number of users of existing numbering schemes. As the existing numbering schemes reach their limits of capacity, new numbering schemes will be devised. If the numbering schemes are programmed into the individual interface units, it will be inconvenient and possibly costly to upgrade the interface units already deployed.

It would be advantageous to provide a system for linking an end user using a standard non-wireless device with a wireless system, thereby providing the mobility and flexibility advantages of wireless service, while at the same time providing compatibility with respect to numbering scheme and digit analysis regardless of which geographic locality the end user operates in, and allowing relatively easy changes to these numbering schemes.

SUMMARY OF THE INVENTION

The present invention in one aspect provides for a system and method for initiating a telephone call over a communication path comprising at least one wireless communication link wherein digit analysis is performed in the base station. In one aspect of the invention, a universal radio converter (URC) connects to one or more standard non-wireless communication devices and establishes a communication link upon user request, by opening a communication channel and transmitting to a base station, without digit analysis, the numbers dialed by the end user substantially at the same time as they are dialed. The base station processes the dialed numbers in a digit analyzer, and when the base station determines that all of the numbers have been dialed, sends them to a central office.

In one embodiment, a URC is connected to a standard non-wireless device through a standard interface, such as an RJ-11 interface, over which DTMF tone signals are transmitted. At the user's request, the URC establishes a wireless communication link with a base station. After the communication link is established, the URC transmits to the base station dialed numbers substantially at the same time they are dialed by the user. The base station performs a digit analysis as they are received according to a local call numbering format, and when the base station determines that it has received all the numbers, initiates a call setup request message.

In another aspect of the present invention, a URC sends dialed numbers to the base station substantially at the same time they are dialed by an end user. The URC comprises means to detect an emergency call request (e.g., a "911" call). When the URC detects an emergency call request, it establishes a communication link by transmitting an emergency priority signal over a reserved wireless channel or an available non-emergency wireless channel.

A preferred embodiment of a method in accordance with one or more aspects of the invention comprises the steps of periodically receiving, at a URC, DTMF tone signals from a standard non-wireless device seeking to establish communication over a network, the tones collectively comprising a destination phone number; establishing a wireless communication link from the URC to a base station after receiving at least one of the tones; transmitting the tones over the wireless communication link from the URC to the base station substantially at the same time the tones are received at the URC; performing digit analysis at the base station and, upon receipt of all the tones, sending the dialed number to the network in conjunction with a call setup request.

Other embodiments, modifications and variations are also described herein.

BRIEF DESCRIPTION OF THE DRAWINGS

The various objects, features and advantages of the present invention are fully explained in the detailed description of the preferred embodiments of the invention found below, together with the figures, wherein:

FIG. 3 is another call process flow chart in accordance with the present invention.

DETAILED DESCRIPTION OF PREFERRED EMBODIMENTS

Figure 1:
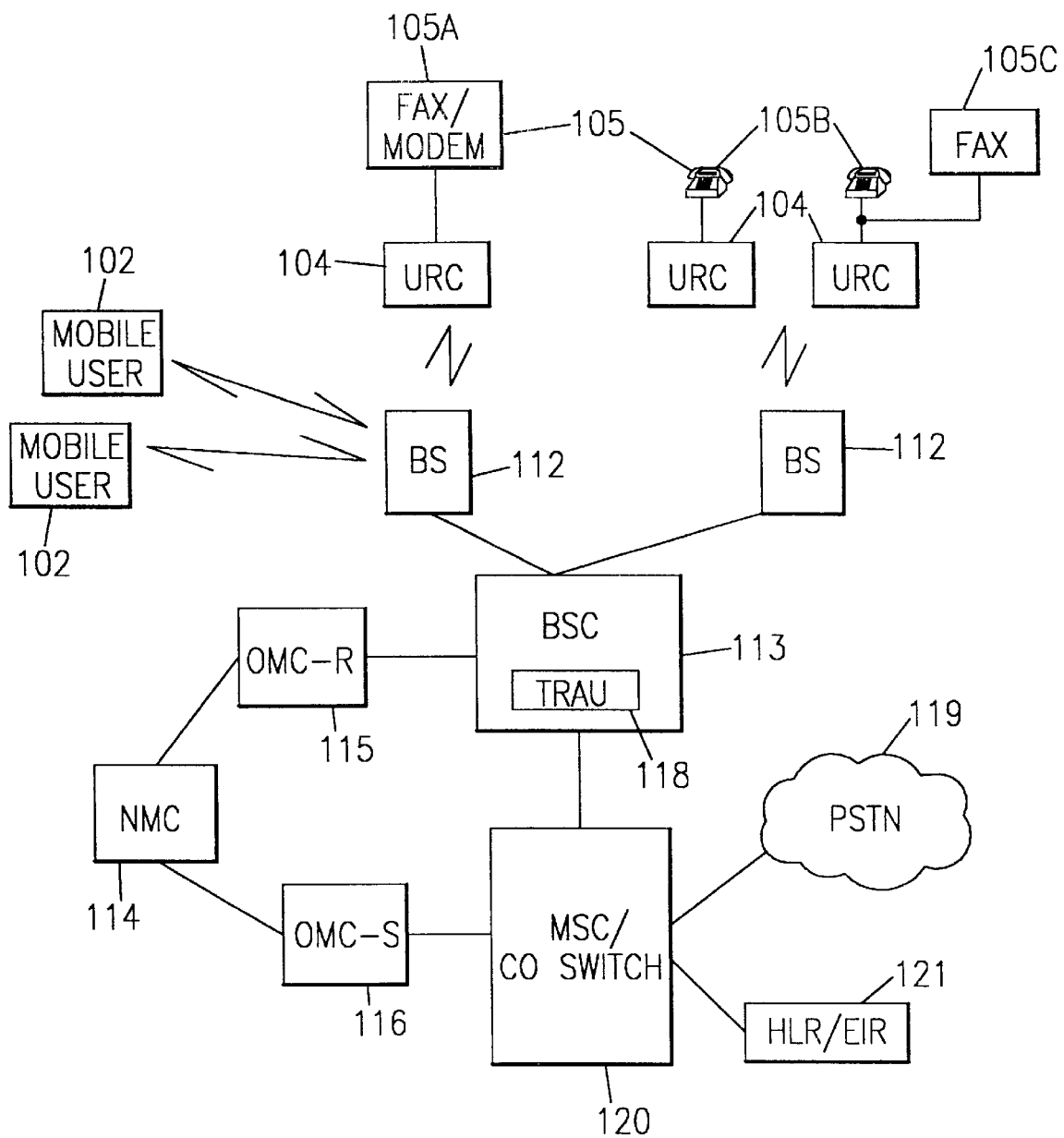
FIG. 1 is a block diagram of a preferred wireless local loop system architecture.

FIG. 1 is a block diagram depicting a preferred communication system architecture. FIG. 1 shows a plurality of remote radio adaptation units, referred to herein as universal radio converters (URCs) 104, which generally provide wireless local loop capabilities as further described below. The FIG. 1 communication system architecture includes one or more base stations 112 which engage in wireless communication with one or more users, preferably using a multiple access communication technique and protocol. For example, a base station 112 may distinguish transmissions to and from different users by using different frequencies, thereby employing frequency division multiple access (FDMA) communication, or may distinguish transmissions to different users by using different codes (e.g., spread spectrum codes), thereby employing code division multiple access (CDMA) communication, or may distinguish transmissions to different users by using different time slots, thereby employing time division multiple access (TDMA) communication, or may use some combination of FDMA, CDMA and/or TDMA. A preferred communication protocol is discussed hereafter with respect to FIGS. 9A–9C.

Also shown in FIG. 1 are standard non-wireless devices 105 depicted as, for example, standard telephones 105b connected to a URC 104, data devices such as a computer or facsimile machine 105a, 105c connected to a URC. The base station 112 is preferably capable of communicating with mobile wireless users 102 in addition to the URCs 104. In a preferred embodiment, the URC 104 and standard non-wireless devices 105 communicate over an RJ-11 interface. The user telephones, data equipment or other standard non-wireless devices 105 shown in FIG. 1 are generically referred to herein as customer premises equipment, or "CPE".

In a preferred communication system architecture, as shown in FIG. 1, base stations 112 in a local geographical region are connected to a base station controller 113. The base station controller 113 connects to a network switch 120, which in turn connects to a public telephone network 119. Alternatively, a base station 112 may in some cases, if provided with the proper interface and intelligence, connect directly to a network switch 120. The network switch 120, in a preferred embodiment, comprises a mobile switching center ("MSC") compatible with GSM, and may comprise, for example, a GSM standard "A" interface. Alternatively, the network switch 120 may comprise a central office ("CO") landline switch.

The base station controller 113 comprises a transcoding and rate adaption unit (TRAU) 118, which translates messages from the base station 112 into a network-compatible format before sending them to the network switch 120. The TRAU 118 may also perform data compression and decompression as necessary according to the specific message formats selected.

The system architecture of FIG. 1 further comprises a network management center ("NMC") 114. The NMC 114 constitutes the overall network management of the system and preferably controls individual operations, administration and management ("OA&M") elements, such as the individual management center 115 that handles the operations, administration, management and processing for the base station controller 113 and base stations 112, and the individual management center 116 that handles the operations, administration, management and processing for the network switch 120. The NMC 114 generally comprises integrated software resident in each of the system elements which utilize its functions.

The FIG. 1 system architecture further includes a home location register and equipment identity register (HLR/EIR) 121 connected to the MSC 120. The home location register of the HLR/EIR 121 comprises a database and stores information pertaining to subscribers, authentication, encryption, roaming restrictions, and the like. The equipment identity register of the HLR/EIR 121 also comprises a database and stores physical identity information for terminals. The HLR/EIR databases are accessed by the MSC 120 as needed to obtain information used in setting up and maintaining the communication link, verifying access authority, billing, and other matters.

Features and operation of a preferred URC 104 are described later herein with respect to FIG. 11 and elsewhere. A preferred over-the-air multiple access protocol for communication between a base station 112 and one or more users (such as a URC 104 or other users) is described first.

Figure 9:
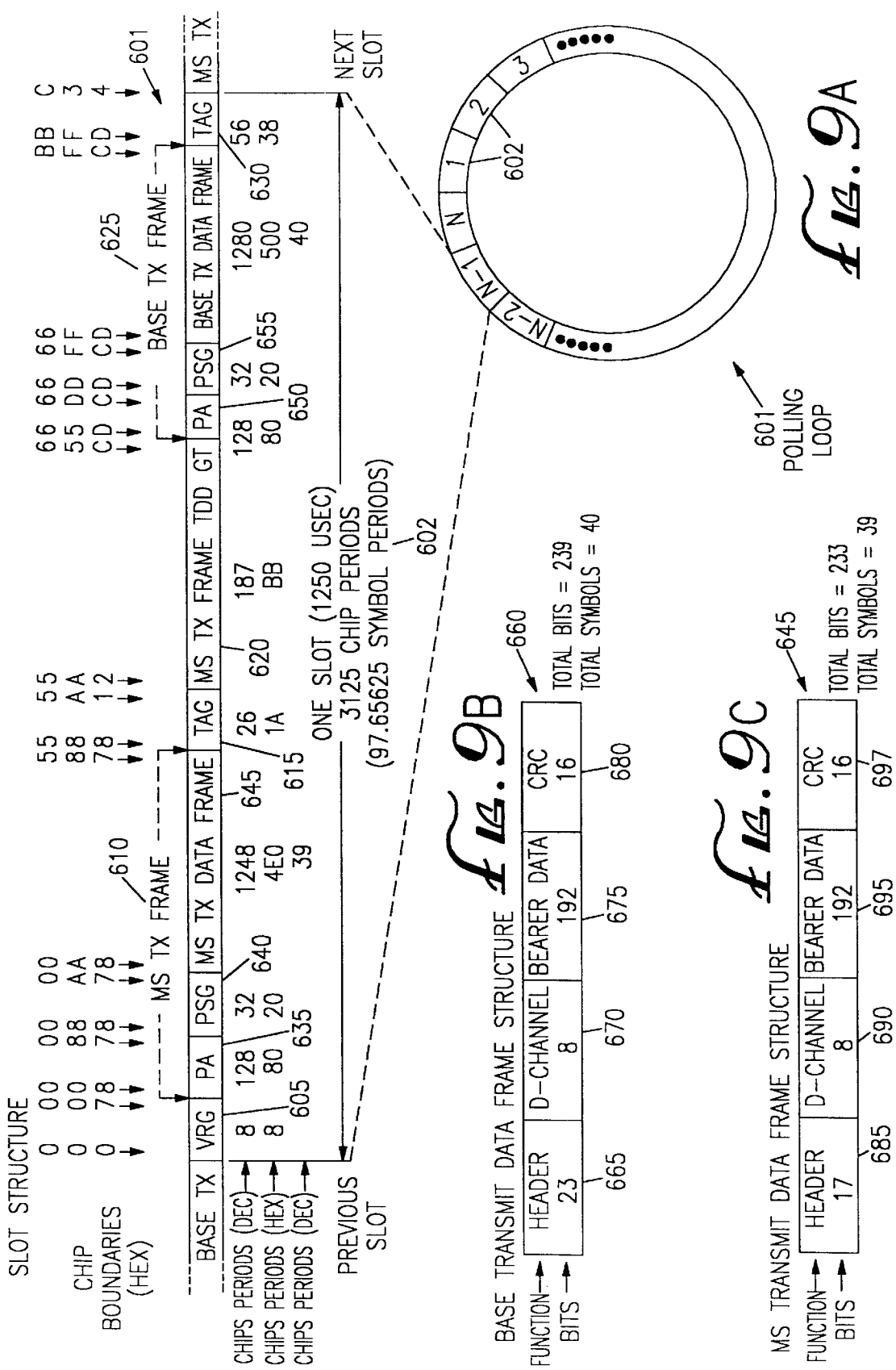
FIG. 9A is a diagram of a preferred time division multiple access protocol.
FIGS. 9B and 9C are diagrams of preferred message formats for the FIG. 9A protocol.

A particular preferred communication protocol using aspects of TDMA is depicted in FIG. 9A. FIG. 9A shows a polling loop (also occasionally referred to herein as a major time frame) 601 that repeats in a continuous pattern. Each polling loop 601 is divided into multiple time slots 610 which may be dynamically assigned for communication between base stations 112 and users (such as URCs 104, or cellular or mobile user stations 102). A base station 112 may thereby communicate with a plurality of user stations on a periodic basis over consecutive polling loops 601. In a preferred embodiment, the polling loop 601 is divided into sixteen time slots 602, and each time slot 602 has a duration of 1.25 milliseconds. Alternatively, each time slot 602 may have a duration of about 1.153 milliseconds, particularly when selected to be of a duration compatible with GSM timing, such as according to techniques described in copending U.S. application Ser. No. 08/548,544 filed Oct. 26, 1995, which application is hereby incorporated by reference as if set forth fully herein.

The time slots 602 in one aspect collectively define a set of transmission channels. Each transmission channel is preferably characterized by a defined frequency, a defined spread spectrum spreading code, and/or a relative spatial direction (e.g., forward or reverse link), FIG. 9A further shows a preferred structure of a time slot 602. Time slot 602 comprises a variable radio delay gap 605, a user station transmit field 610, a base processor gap 615, a guard time 620, a base transmit field 625, and a radar gap 630. Each user station transmit field 610 comprises a user preamble 635, a user preamble sounding gap 640, and a user station data field 645. Similarly, each base transmit frame 625 comprises a base preamble 650, a base preamble sounding gap 655, and a base transmit data field 660.

FIG. 9B shows a preferred structure for the base transmit data field 660. The base transmit data field 660 comprises a base header field 665, a base D-channel field 670, a base data field 675, and a base cyclical redundancy check (CRC) field 680. In a preferred embodiment, the base header field 665 is 23 bits, the base D-channel field 670 is 8 bits, the base data field 625 is 192 bits, and the base CRC field 680 is 16 bits.

FIG. 9C shows a preferred structure for the user station transmit data field 645. The user station data field 645 comprises a user header field 685, a user D-channel field 690, a user data field 695, and a user CRC field 697. In a preferred embodiment, the user header field 685 is 17 bits, the user D-channel field 690 is 8 bits, the user data field 695 is 192 bits, and the user CRC field 697 is 16 bits.

Exemplary signal contents for signaling information are described in, e.g., copending U.S. application Ser. No. 08/532,466 filed Sep. 22, 1995, which is hereby incorporated by reference as if set forth fully herein.

The base stations 112 and user stations (e.g., URCs 104, or other user stations 102 communicating with a base station 112) each preferably transmit an M-ary spread spectrum signal wherein each transmitted symbol represents N bits of data, where $N=\log_2 M$. In a preferred embodiment, the base station 112 and user stations each transmit an M-ary direct sequence spread spectrum signal, M=32, using a spreading code of 32 chips. Each transmission comprises one of thirty-two distinct symbols for a spread spectrum code sequence (called a "symbol code") of thirty-two chips. Each of the thirty-two distinct symbols is associated with a distinct 5-bit data pattern. A sixth bit of information is obtained by differential phase encoding. Thus six data bits are represented by each 32-chip spreading sequence or symbol code.

Exemplary means for transmitting and receiving signals in a spread spectrum format using continuous phase modulation are described in, for example, U.S. patent application Ser. No. 08/481,613 filed Jun. 7, 1995, hereby incorporated by reference as if set forth fully herein.

Preferably, each time slot 602 comprises a total of 3125 chip periods, such that base station transmissions and user station transmissions are transmitted at a chip rate of 2.5 Mchips/second. In such a case, each symbol period is 12.8 $\mu$sec., yielding a burst data rate of 468.75 kbps.

Figure 11:
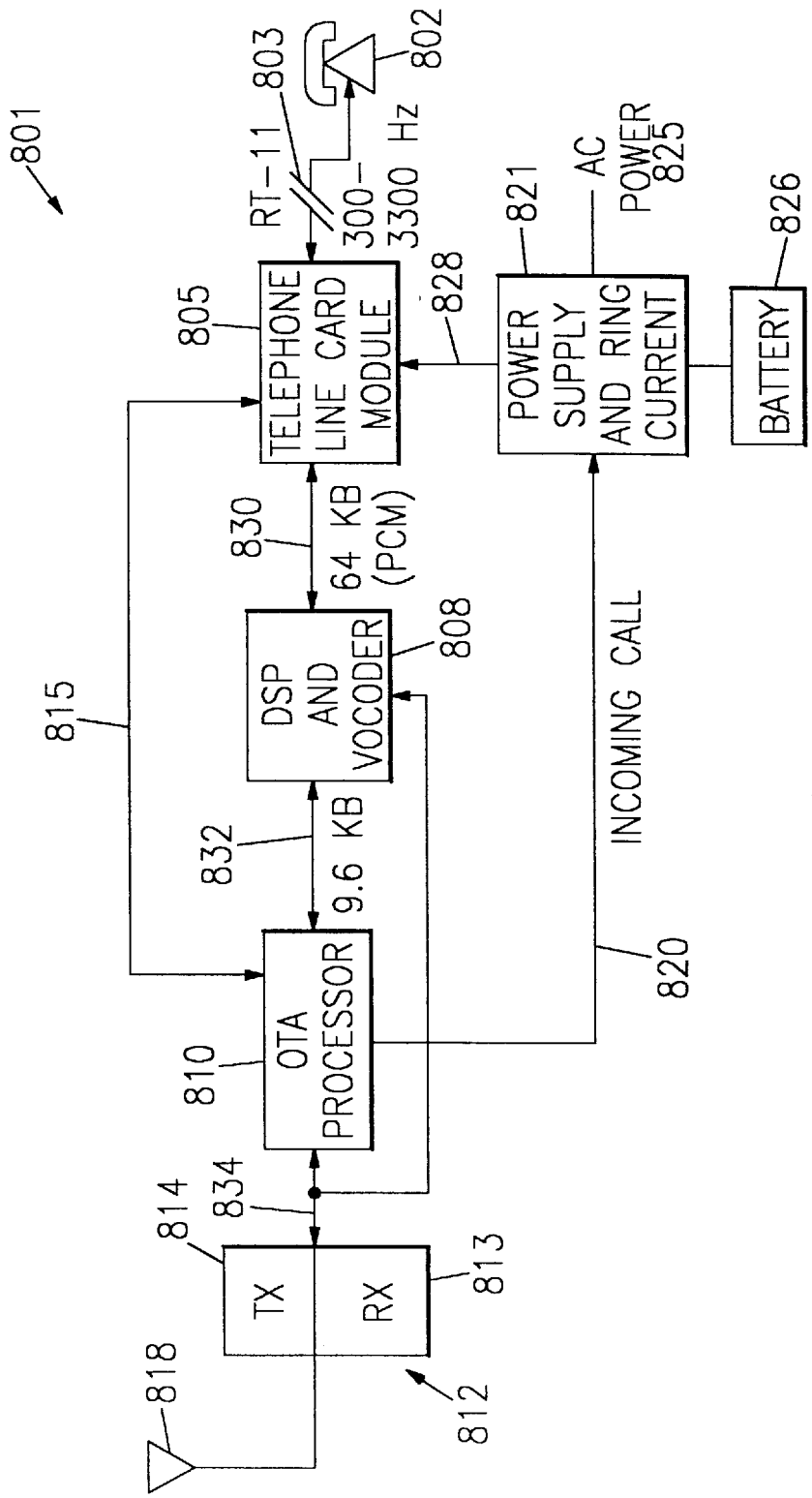
FIG. 11 is a block diagram of a preferred universal radio converter (URC) in accordance with one or more aspects of the present invention.

Features of a preferred URC 104 such as illustrated in FIG. 1 are shown in the block diagram of FIG. 11. FIG. 11 shows a URC 801 generally comprising a telephone line card module 805, a digital signal processing (DSP) and vocoder unit 808, an over-the-air (OTA) processor 810, a transceiver 812, and an antenna 818. A power supply and ring current generator 821 are connected to an AC power source 825 and are also resident on the URC 801. A battery 826 is connected to the power supply and ring current generator 821 to provide emergency backup power.

The URC 801 connects across an RJ-11 interface 803 to a standard non-wireless device, such as a standard telephone 802 (alternatively, a modem, facsimile machine, or any other RJ-11 compatible device). The telephone 802 transmits information to, and receives information from, the telephone line card module 805. Information is exchanged between the telephone 802 and the telephone line card module 805 in standard analog format (i.e., tone and voice signals generally in the range of 300 to 3300 Hz). The telephone line card module 805 translates information from the telephone 802 into pulse-code modulated (PCM) signals which are provided to the DSP and vocoder unit 808. The DSP and vocoder unit 808 encodes the information received from the telephone line card module 805 according to any suitable vocoding process, and provides information to the OTA processor 810 or transceiver 812 as needed.

The OTA processor 810 is responsible for, among other things, setting up a call over a wireless communication link with the base station 112 (see FIG. 1), and for exchanging signaling traffic with the base station 112. The OTA processor 810 is connected to the transceiver 812, which includes a transmitter portion 814 and receiver portion 813 for transmitting messages to and receiving messages from base station 112. The transceiver 812 is generally responsible for maintaining link timing synchronization, packetizing and de-packetizing data according to the appropriate over-the-air protocol, modulating signals to be transmitted, and demodulating signals received from the base station 112. If spread spectrum encoding is used, the transceiver 812 spread spectrum encodes data to be transmitted, and decodes spread spectrum encoded data received from the base station 112, using any of a number of suitable correlation techniques as known in the art.

The DSP and vocoder unit 808 is connected to the transceiver 812 and the telephone line card module 805. While the OTA processor 810 generally performs control traffic and signaling functions, the DSP and vocoder unit 808 generally sends and receives bearer traffic. The DSP and vocoder unit 808 exchanges pulse-code modulated (PCM) information with the telephone line card module 805. For outgoing data, the DSP and vocoder unit 808 receives PCM data from the telephone line card module 805, applies the appropriate vocoder algorithm and voice compression (if any) to the data to be transmitted, and provides the data to the transceiver 812 for transmission. For incoming data, the DSP and vocoder unit 808 receives the data from the transceiver 812, applies the appropriate vocoder algorithm and voice decompression (if any), and converts the bearer traffic information into PCM data for the telephone line card module 805. The telephone line card module 805 converts the PCM data to analog information and provides it to the telephone 802.

The OTA processor 810 is connected to the telephone line card module 805 across a telephony signaling interface 815. The telephony signaling interface 815 is used to communicate signaling information between the OTA processor 810 and the telephone line card module 805. For example, when the telephone line card module 805 detects that the telephone 802 has gone off-hook (or, alternatively, after the telephone line card module 805 receives the first dialed number from the telephone 802), the telephone line card module 805 transmits an off-hook signaling message across the telephony signaling interface 815 informing the telephony signaling interface 815 that channel acquisition and call setup may be initiated.

Speech and tone data sent over the wireless communication channel are provided directly from the transceiver 812 to the DSP and vocoder unit 808, bypassing the OTA processor 810. The DSP and vocoder unit 808 applies its algorithms directly to the incoming speech and tone data.

Figure 10:
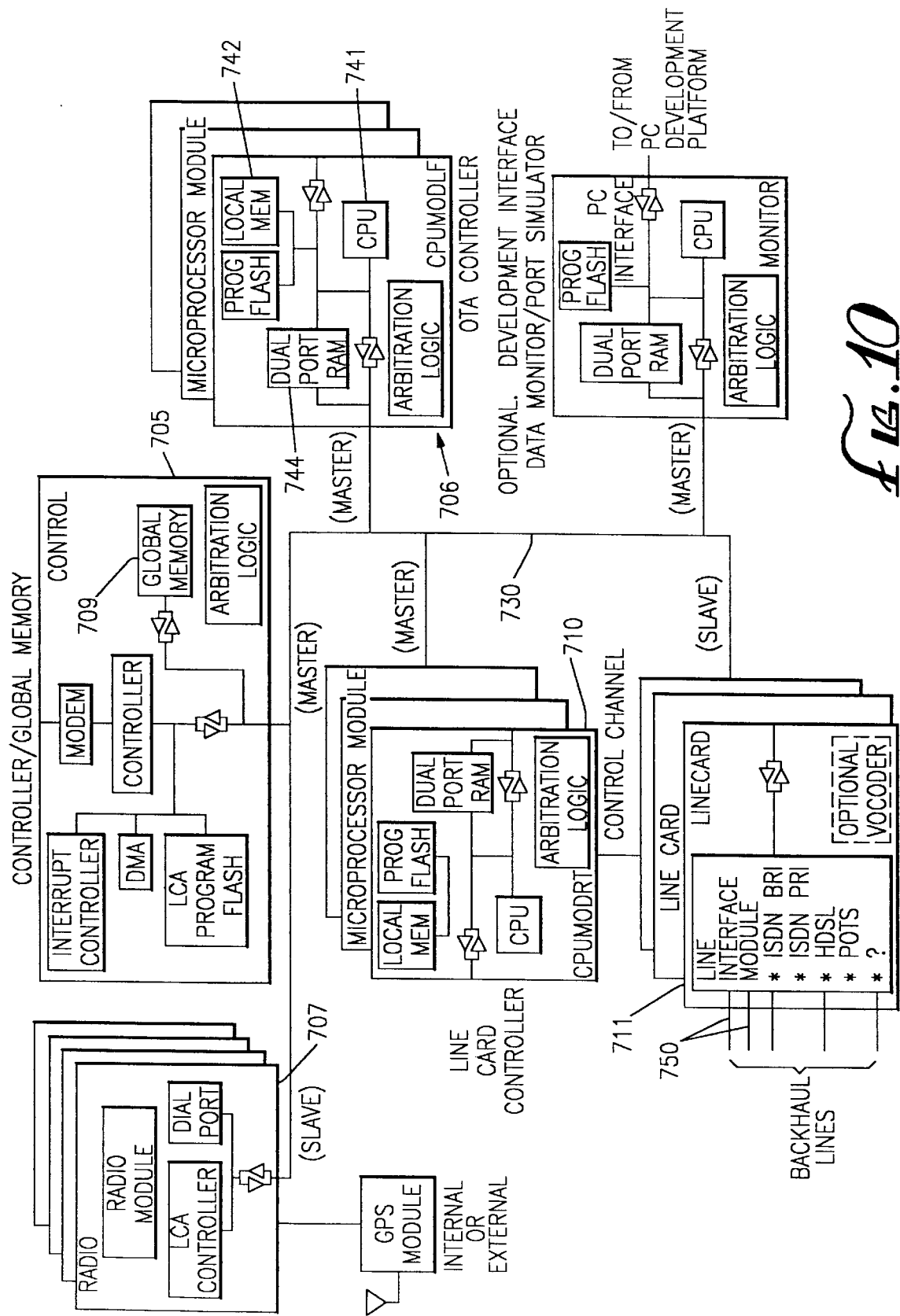
FIG. 10 is a block diagram of a preferred base station.

A block diagram of a preferred base station 112 with which the URC 801 of FIG. 11 may communicate is shown in FIG. 10. The FIG. 10 base station comprises a plurality of radios 707, each comprising a transceiver, and each connected to a different antenna (not shown) so as to provide antenna diversity capability in the base station 112. The base station further comprises a control card 705 (with global memory 709), an over-the-air (OTA) controller 706, a line card interface 711, and a line card controller 710. A global bus 730 connects the control card 705, the line card controller 710, the OTA controller 706, the line card interface 711, and the radios 707.

The radios 707, under control of the OTA controller 706, transmit and receive messages from user stations (such as URCs 104). The line card interface 711, under control of a line card controller 710, transmits and receives messages from a base station controller 113 (see FIG. 1) over backhaul lines 750. The control card 705 controls mode selection of the OTA controller 706 and line card controller 710, handles interrupts, and responds to commands from the system regarding operation of the base station 112 as a unit (e.g., whether the base station 112 should be on-line or off-line, etc.). A dual-port random-access memory (RAM) 744 is included in the FIG. 10 base station, and is accessible both the OTA controller 706 and the line card controller 710. The dual-port RAM 709 preferably comprises a plurality of queues and buffers for storing messages originating from and destined for user stations.

In a preferred embodiment, the dual port RAM 709 comprises a common memory which may be accessed by both the line card interface 711 and the OTA controller 705. The line card interface 711 and the OTA controller 705 transfer information across an interface by reading and writing messages to the common dual port RAM 709. The dual port RAM 709 is also used for transfer of bearer information for each of the time slot channels, and thus preferably comprises adequate storage to transfer data blocks to and from user stations.

Further details regarding a preferred base station 112 may be found in copending U.S. application Ser. No. 08/532,466 filed on Sep. 22, 1995, hereby incorporated by reference as if set forth fully herein.

The base stations 112 are preferably configured to perform digit analysis on dialed numbers received from a URC 104. A base station 112 comprises a digit analyzer which counts dialed numbers as they are received from a URC 104 and determines when a complete destination telephone number has been received. The amount of dialed numbers to be received depends in part on the numbering scheme of the locality in which the base station 112 is deployed. For example, if deployed within the United States, a base station 112 may be configured so that the digit analyzer recognizes that, in the absence of certain other conditions such as those noted below, the ordinary amount of dialed numbers to be expected is seven; that if the first three numbers received are "411" or "911", then no more digits are expected to be received; that if the first numbers received are "01" or "011" then a number of digits suitable for an international call are expected; that if the first number received is a "0" and no further numbers are received within a predefined timeout period then an operator call is being made and no further digits are expected; that if the first digit is a "1" then the call is domestic long distance and a total of eleven dialed numbers (including the "1") are expected; and so on.

In a preferred embodiment, the digit analyzer stores logic for the digit analysis in the form of software instructions, and the digit analysis software for a given numbering scheme can be downloaded remotely into the digit analyzer of each base station 112. In this embodiment, if the local numbering scheme is changed or enlarged, the new numbering scheme is downloaded into the base station, and the base station 112 is thereby capable of being modified to support the new numbering scheme without having to be physically serviced (by, e.g., having a circuit card replaced), nor is it necessary to replace or reprogram the URCs 104 that have been previously deployed. The ability to use the same URCs 104 with different numbering schemes stored in the base stations 112, without necessarily having to reprogram or modify the URCs 104, makes the URCs 104 in this sense "universal".

Where the base station 112 comprises a digit analyzer including software instructions that can be modified remotely by downloading new software instructions, the NMC 114 and OMC-R 115 (see FIG. 1) preferably trigger and control the downloading of the new software instructions into the base station 112.

Figure 2:
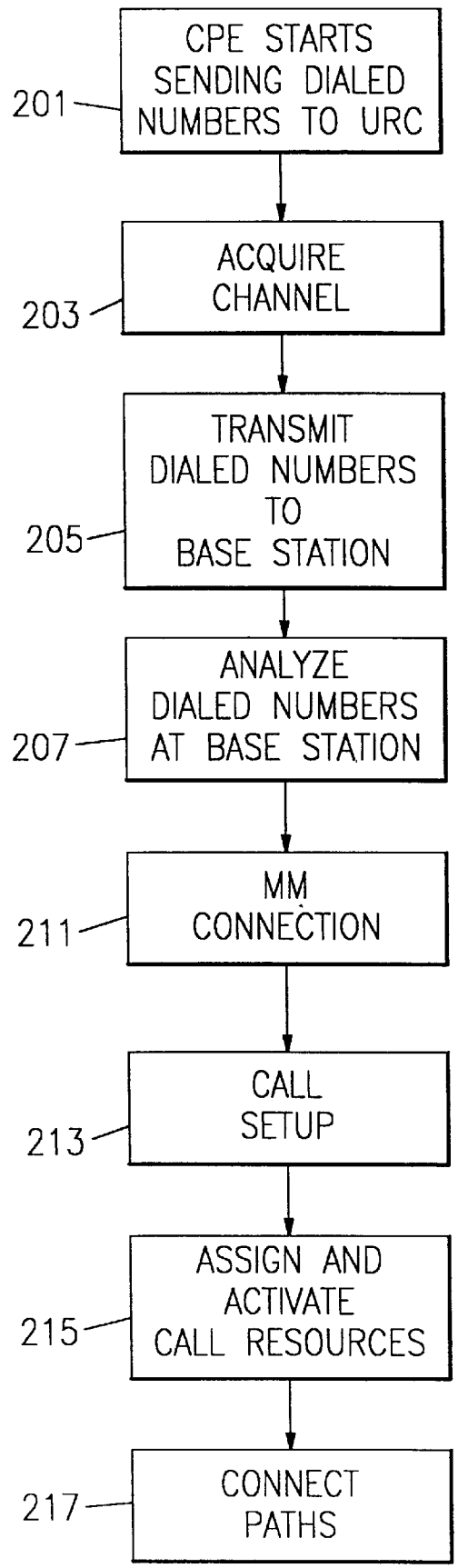
FIG. 2 is a call initiation process flow chart in accordance with the present invention.

FIG. 2 is a flow chart illustrating steps for a preferred call setup routine for a call originating from a standard non-wireless device. In the FIG. 2 call setup routine, in a first step 201, the CPE 105 goes off-hook and starts to send signals indicative of dialed numbers to the URC 104. These signals may, for example, be DTMF tone signals or, alternatively, pulse dialed signals.

After the URC 104 starts to receive dialed numbers from the CPE 105, the URC 104 acquires a communication channel with a local base station 112 (see FIG. 1), as shown in step 203. The communication channel may be of any variety supported by a local wireless loop, and may, for example, be defined by a particular frequency or frequency band, code (e.g., spread spectrum code), or time slot, or any combination thereof, depending on the nature of the wireless system with which the URC 104 communicates.

In a next step 205, the URC 104 transmits the digital representation of the DTMF tones or numbers dialed to the base station 112 substantially at the same time as they are provided from the CPE 105. The dialed numbers are analyzed at the base station 112 according to the numbering plan of the local region programmed into the base station 112, as reflected in step 207. In a next step 211, a mobility management connection (or its equivalent in non-GSM systems) is set up to manage the call. Once the base station 112 has analyzed the dialed numbers of the outgoing call, in step 213 call setup proceeds under the control of the mobility management connection. In a next step 215, call resources for the call being setup are assigned and activated. In a next step 217, the paths are connected to complete the call, and the conversation, data transfer or other type of end-user communication is carried out.

Figure 4A:
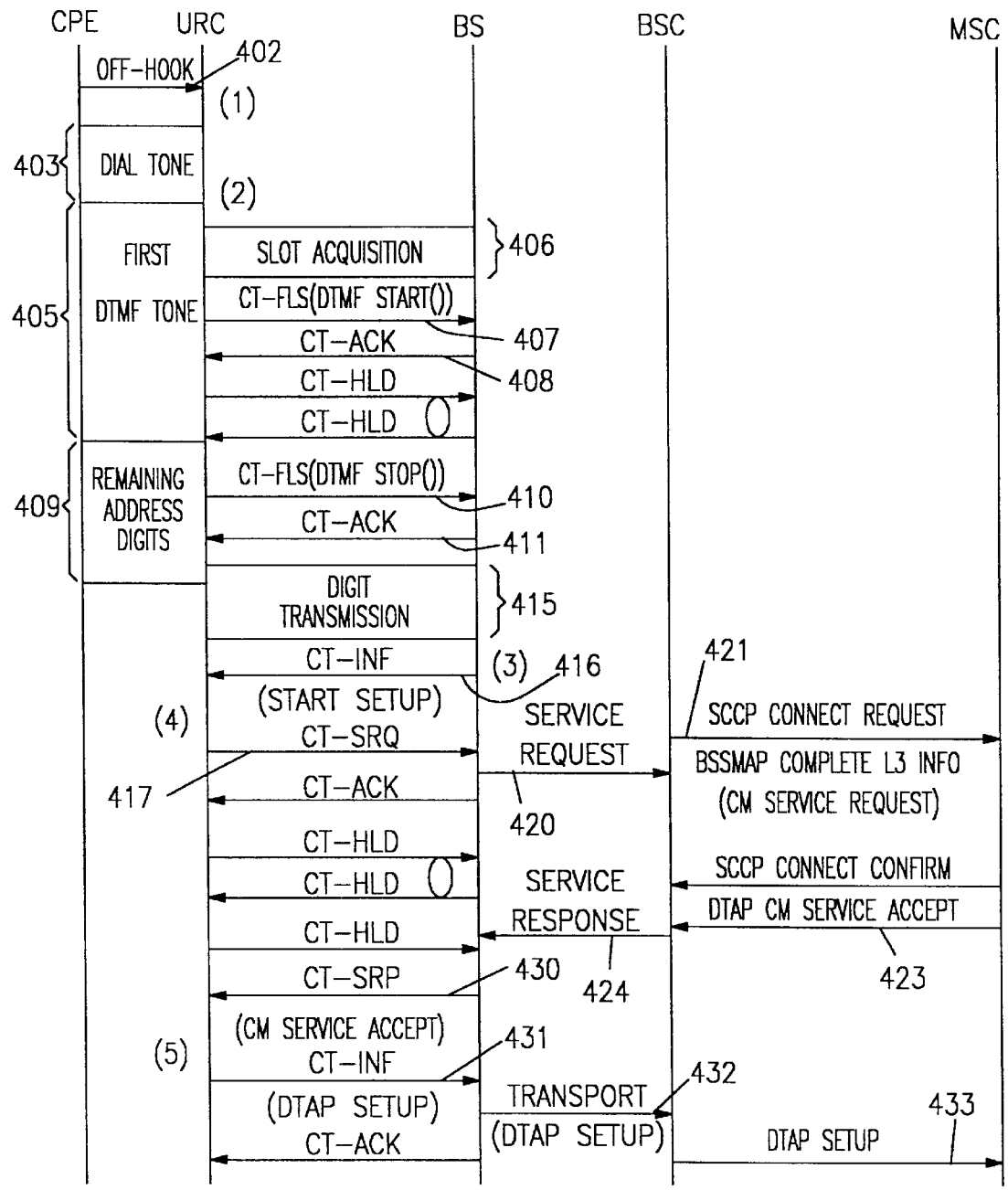
FIGS. 4A and 4B collectively depict a preferred call flow for setting up a call in accordance with the process depicted in FIG. 3.
Figure 4B:
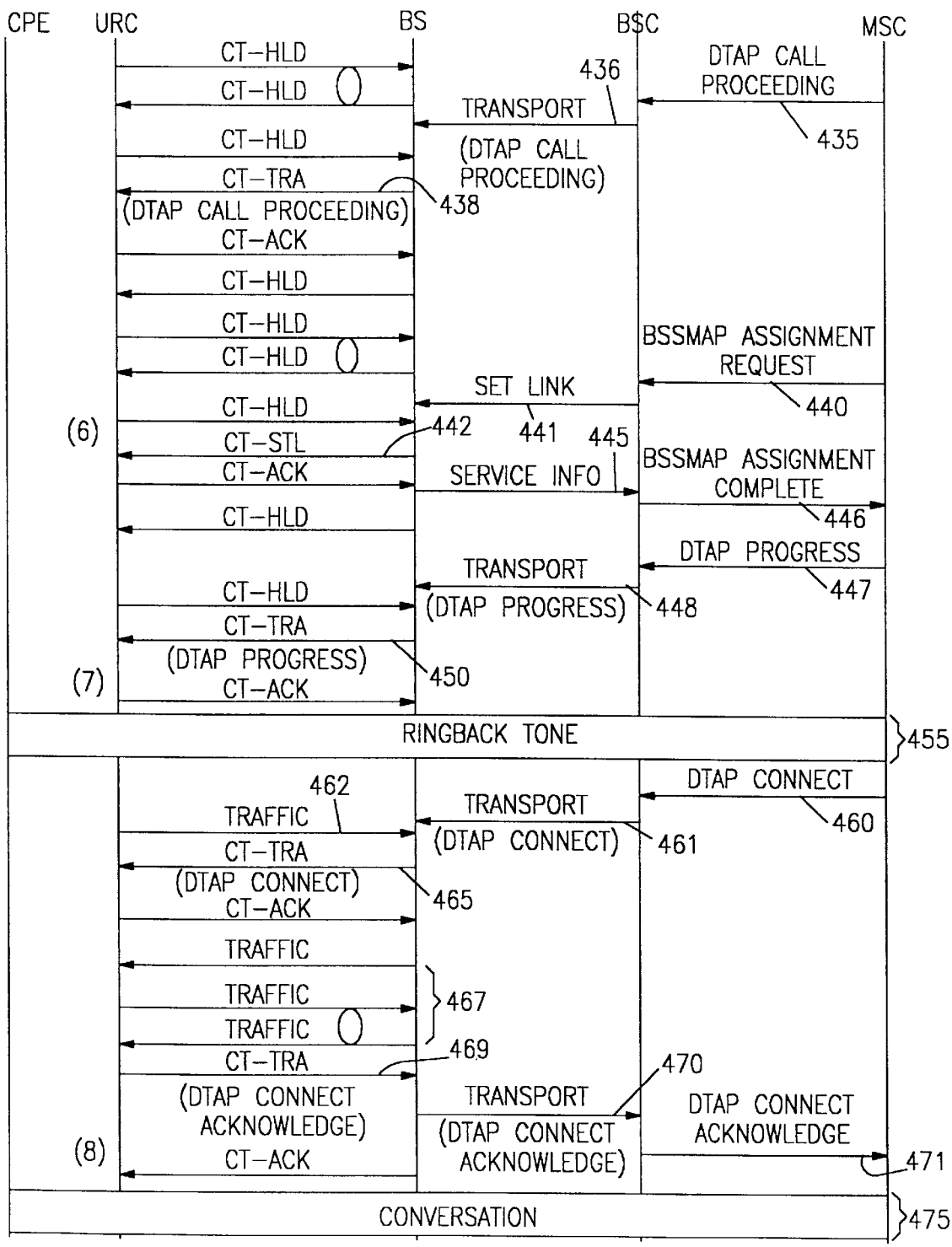

FIG. 3 is a process flow chart showing a particular embodiment of the present invention. FIGS. 4A and 4B collectively depict a call flow sequence for setting up a communication link in accordance with a preferred embodiment of the present invention. The steps of FIG. 3 and the call flow sequence of FIGS. 4A–4B are explained in part with reference to the preferred URC of FIG. 11 and the preferred base station of FIG. 10.

In one aspect of the flow chart of FIG. 3 and the preferred call flow structure shown in FIGS. 4A and 4B, analysis of dialed numbers sent from the CPE 105 is performed at the base station 112. The URC 104 passes DTMF tones (i.e., digits) received from the CPE 105 to the base station 112, preferably using signaling messages as further described herein. The dialed numbers are preferably collected and analyzed at the base station 112. An advantage of this technique is that it allows the rules for digit analysis (i.e., the dialing or numbering plans) to be resident in the base station 112. As such the numbering plan algorithms can be changed easily by, for example, downloading new algorithms from the NMC 114 and OMC-R 115, without having to replace or modify the remotely located URCs 104.

The exemplary FIG. 3 flow chart and the exemplary call flows illustrated in FIGS. 4A and 4B are described for a preferred GSM-based communication system that uses GSM management elements and call features, but which uses the preferred TDMA protocol described with respect to FIG. 9A rather than the standard GSM over-the-air protocol (which utilizes, among other things, two frequency bands for FDD communication and eight time slots per frequency band). The call flow pattern of FIGS. 4A–4B and the FIG. 3 call setup procedure steps are, however, meant to be illustrative, and particular call flow patterns may be constructed for non-GSM systems by modifying the call flow pattern of FIGS. 4A–4B or otherwise constructing a call flow pattern according to the principles and techniques disclosed and described herein.

The arrows in FIGS. 4A and 4B (as well as in the other call flow diagrams described herein) represent transmitted messages, with the direction of the arrow indicating the direction of transmission of the message. In a first step 301 as shown in the FIG. 3 flow chart, the URC 104 waits in a standby state until an off-hook signal from the CPE 105. In FIG. 4A, the off-hook signal 402 is shown being transmitted from the CPE 105 to the URC 104. The receipt and detection of the off-hook signal is preferably performed at the URC 104 by the telephone line card module 805 shown in FIG. 11.

When the off-hook signal is detected, as reflected in a next step 302 in FIG. 3, the URC 104 starts to provide a dial tone to the CPE 105. The dial tone provision is indicated by the shaded area 403 in the call flow pattern of FIG. 4A. In a next step 303, the URC 104 then awaits the first dialed number from the CPE 105. When the URC 104 receives the first dialed number (as detected by the telephone line card module 805), the URC 104 removes the dial tone, as reflected in steps 303 and 304 of FIG. 3. Provision of the first dialed number (e.g., DTMF tone) is shown as the shaded area 405 in FIG. 4A.

After receiving the first DTMF tone, the URC 104 starts to acquire a communication channel to the base station 112, as reflected in step 305 of FIG. 3 and in the shaded area 406 of FIG. 4A. In a preferred embodiment, a TDMA timing structure such as shown in FIG. 9A is used, so that acquisition of a communication channel by the URC 104 is equivalent to acquiring a time slot 602 of a local base station 112. Acquisition of a time slot may be carried out by any suitable means known in the art-for example, by means such as described in U.S. Pat. No. 5,455,822 issued on Oct. 3, 1995, or in U.S. patent application Ser. No. 08/284,053 filed on Aug. 1, 1994, each of which is hereby incorporated by reference as if set forth fully herein.

In general, acquisition of a time slot is preferably accomplished by detecting a general poll message transmitted by the base station 112 during an available time slot, and transmitting from the URC 104 a general response message to the base station 112. In response to receiving the general response message, the base station 112 transmits to the URC 104 a specific polling message. In response to receiving the specific polling message, the URC 104 either transmits a specific response message, or starts to transmit traffic messages (either bearer or control traffic). Communications between the URC 104 and base station 112 thereafter occur in the time slot acquired by the URC 104.

While in the presently preferred embodiment the TDMA protocol of FIG. 9A is used for wireless communication between the URC 104 and base station 112, the principles of the present invention are not limited to a TDMA system, and may be applied to FDMA or CDMA communication, or to some combination of TDMA, FDMA and CDMA (including TDD or FDD communication).

After acquiring a communication channel (i.e., time slot), as reflected in a next step 311 of FIG. 3 the URC 104 starts transmitting digitized DTMF tones (digits) using control traffic messages. Control traffic messages are those preceded by a "CT" in their reference captions shown in FIGS. 4A and 4B. The URC 104 indicates the start of the first DTMF tone by transmitting a control traffic forward line signal (CT-FLS) message 407 to the base station 112, bearing a symbol representing the start of a DTMF tone (i.e., DTMF_Start()). The CT-FLS message 407 preferably includes the appropriate digit as information. In response to the CT-FLS message 407, the base station 112 transmits a control traffic acknowledgment (CT-ACK) message 408 to the URC 104.

The URC 104 exchanges control traffic hold (CT-HLD) messages with the base station 112 during the duration of the first tone. At the end of the first tone, the URC 104 transmits to the base station 112 a control traffic CT-FLS message bearing a symbol DTMF_Stop( ), indicating the end of a DTMF tone. The base station 112 responds with a control traffic acknowledgment (CT-ACK) signal.

After sending the first DTMF tone to the URC 104, the CPE 105 continues to send dialed numbers (in the form of digitized DTMF tones) to the URC 104. The transmission of further dialed numbers from the CPE 105 to the URC 104 is depicted by the shaded area 409 in FIG. 4A. While the URC 104 is awaiting the receipt of DTMF tones from the CPE 105, it transmits a control traffic hold (CT-HLD) message to the base station 112, to which the base station 112 responds with its own control traffic hold (CT-HLD( )) messages. As the URC 104 receives each dialed number, the URC 104 transmits the dialed number to the base station 112 in the same manner as it transmitted the first dialed number. Thus, the URC 104 transmits a CT-FLS message with a symbol DTMF_Start( ) to indicate the start of each DTMF tone, and a CT-FLS message with a symbol DTMF_Stop( ) to indicate the end of each DTMF tone. In this manner, the duration of the DTMF tones are emulated across the URC 104 to base station 112 connection.

For each DTMF tone sent to the base station 112, the digit information is preferably transmitted as part of the CT-FLS message including the DTMF_Start( ) symbol. The DTMF tone value is encoded and sent in a digital format as part of the DTMF_Start( ) message from the URC 104 to the base station 112.

The transmission of the remaining dialed numbers from the URC 104 to the base station 112 is depicted by the shaded region 415 in FIG. 4A. The rate at which the dialed numbers are sent to the base station 104 depends on how fast the CPE 105 dials. When dialed numbers are not being sent, the URC 104 and base station 112 exchange CT-HLD messages.

While receiving the dialed numbers, the base station 112 starts to perform digit analysis, using any of a variety of standard techniques of digit analysis as known in the art. The base station 112 formats the dialed numbers according to the numbering plan of the locality in which the base station 112 is situated. The numbering plan is pre-programmed into the base station, thereby removing digit analysis from the URC 104 and allowing deployment of the same URC 104 in different geographic localities without requiring reprogramming of the URC 104.

While steps 311, 312, 313 and 321 are shown in a particular order in the flow chart of FIG. 3, it is to be understood that the operations signified by those steps may overlap or be conducted in parallel at the base station 112 and the URC 104. The particular arrangement of steps 311, 312, 313 and 321 in FIG. 3 is not meant to be restrictive in this regard.

When the base station 112 determines that enough dialed numbers are received, according to the local numbering plan, the is call setup process of FIG. 3 moves from step 320 to step 321. The base station 112 sends a control traffic information (CT-INF) message 416 to the URC 104, informing the URC 104 that call setup may begin. In a next step 322, in response to the CT-INF message 416, the URC 104 initiates a mobility management connection establishment using DTAP mobility management signaling with the network switch 120.

To this end, the URC 104 sends a control traffic call setup request (CT-SRQ) message 417 to the base station 112. In response to receiving the CT-SRQ message, the base station 112 sends a Service Request message 420 to the base station controller 113. The base station 112 also sends a control traffic acknowledge (CT-ACK) message back to the URC 104. The URC 104 and base station 112 exchange hold messages (CT-HLD and CT-HLD( ), respectively) while waiting for a response from the base station controller 113. Meanwhile, the base station controller 113 sends a signal link request (SCCP Connect Request) message 421 (or a non-GSM equivalent, if the network switch 120 is not a GSM switch) to the network switch 120. The signal link request message 421 includes BSSMAP information including the identity of the cell, base station, and cluster, an indication of the nature of the call (e.g., emergency or non-emergency), and other standard information. At this point, the network switch 120 may optionally initiate a call authentication procedure as part of the mobility management connection establishment procedure (the steps for which are not shown in FIG. 3 or in the call flow diagrams of FIG. 4A).

When the network switch 120 establishes a connection over the network 119, it sends a direct transfer application part (DTAP) CM Service Accept message 423 (or a non-GSM equivalent) to the base station controller 113. The base station controller 113 in turn sends a Service Response message 424 to the base station 112. The base station 112 then at the earliest opportunity sends a control traffic setup response (CT-SRP) message 430 comprising a CM Service Accept message to the URC 104, thereby informing the URC 104 that the signal link request has been accepted and completing the mobility management setup. The receipt of the CT-SRP message 430 signifies to the URC 104 that the connection establishment procedure is complete, and (assuming that the network switch 120 is a GSM mobile switching center) that a signaling link had been set up for the call on the GSM A-interface with the network switch 120.

After the mobility management initiation step 322 in FIG. 3, the call setup procedure moves to a next step 325, wherein the URC 104 sends to the base station 112 a DTAP setup message, without digits, thereby instructing the base station 112 to pass the destination phone number to the network so as to complete the call.

As shown in FIG. 4A, in response to receiving the CT-SRP message 430 and completing the mobility management setup, the URC 104 sends a control traffic information (CT-INF) message 431 comprising an "empty" DTAP Setup message to the base station 112. The DTAP Setup message sent by the URC 104 is constructed with empty digits, as the digits (i.e., dialed numbers) have already been transmitted to the base station 112. In response to receiving the DTAP Setup message from the URC 104, the base station 112 inserts into the DTAP Setup message the dialed numbers previously collected from the URC and stored in local memory 742, and then sends a Transport message 432 comprising the DTAP Setup message to the base station controller 113, as reflected in steps 326 and 327 of FIG. 3. Concurrently, the base station 112 sends a control traffic acknowledgment (CT-ACK) message to the URC 104.

Alternatively, if desired, the base station can send the digits back to the URC appended to the CT-INF signal 416 or the CT_SRP signal 431 or at any other time while waiting for the service response 424 from the network. In this case CT-INF signal 431 would include the dialed number appended to it and the base station would not have to perform the appending allowing it to send the DTAP Setup signal directly to the network without modification.

In response to receiving the Transport message 432 from the base station 112, the base station controller forwards the DTAP Setup message 433 to the network switch 120. While awaiting a response from the network switch 120 and the base station controller 113, the base station 112 and URC 104 exchange control traffic hold messages (i.e., CT-HLD and CT-HLD( ), respectively). The network switch 120 eventually responds to the base station controller 113 with a DTAP Call Proceeding message 435, as shown in FIG. 4B, indicating acceptance of the call setup request. In response thereto, the base station controller 113 sends a Transport message 436 comprising the DTAP Call Proceeding message to the base station 112. The base station 112 at the next opportunity sends a control traffic transport (CT-TRA) message 438 comprising the DTAP Call Proceeding message to the URC 104. The URC 104 then responds to the base station 112 with a control traffic acknowledgment (CT-ACK) message.

The URC 104 then awaits an indication from the network switch 119 that network resources are assigned for the call (see step 215 in FIG. 2). During this time, the URC 104 and base station 112 exchange control traffic hold messages. When network resources have been assigned, the network switch 120 sends a BSSMAP Assignment Request message 440 to the base station controller 113. In response, the base station controller 113 sends a Set Link message 441 to the base station 112. At the earliest opportunity thereafter, the base station 112 sends a control traffic set link (CT-STL) message 442 to the URC 104. In response thereto, the URC 104 transmits a control traffic acknowledgment (CT-ACK) message to the base station 112. The URC 104, having received an indication that network resources are assigned for the call, activates its resources (e.g., vocoder). At this point, a bearer path has been established between the CPE 105 and the network 119. The path is also used to carry call progress signals provided by the network 119.

In response to receiving the CT-ACK signal from the URC 104, the base station 112 sends a Service Information message 445 to the base station controller. The base station 112 also sends a control traffic hold (CT-HLD) message to the URC 104, informing the URC 104 to await an ensuing call progress signal. In response to receiving the Service Information message 445, the base station controller 113 sends a BSSMAP Assignment Complete message 446 to the network switch 120.

For a PSTN network connection, the network switch 120 may send a DTAP Progress message from the network 119 which is relayed to the URC 104. A DTAP Progress message 447 is sent by the network switch 120 to the base station controller 113. In response, the base station controller 113 sends a Transport message 448 comprising a DTAP Progress message to the base station 112. At the earliest opportunity, the base station 112 sends a control traffic transport (CT-TRA) message 450 comprising the DTAP Progress message to the URC 104. In response thereto, the URC 104 sends a control traffic acknowledgment (CT-ACK) message to the base station 112. Receipt of the DTAP Progress message triggers the URC 104 to connect the bearer path between the CPE 105 and URC 104 and the over-the-air bearer path between the URC 104 and the base station 112.

A ringback tone is delivered in-band from the network switch 120 to the CPE 105. The ringback tone is depicted by the shaded region 455 in FIG. 4B. During the ringback tone interval, the CPE 105 receives a ring tone indicating that the call target has not yet answered.

When the call has been answered, the ringback tone is removed, and the network switch 120 sends a DTAP Connect message 460 to the base station controller 113. In response thereto, the base station controller 113 sends a Transport message 461 comprising a DTAP Connect message to the base station 112. At the earliest opportunity, the base station 112 transmits a control traffic transport (CT-TRA) message 465 comprising a DTAP Connect message to the URC 104. In response thereto, the URC 104 sends a control traffic acknowledge (CT-ACK) message to the base station 112. Thereafter, the base station 112 and the URC 104 communicate with bearer traffic messages, represented by Traffic signal messages 467 in FIG. 4B.

The final step in call establishment is the sending of a DTAP Connect Acknowledge signal from the URC 104 to the network 119. The URC 104 sends a control traffic transport (CT-TRA) message 469 comprising a DTAP Connect Acknowledge message to the base station 112. In response thereto, the base station 112 sends a Transport message 470 comprising a DTAP Connect Acknowledge message to the base station controller 113. In response thereto, the base station controller 113 sends a DTAP Connect Acknowledge message 471 to the network switch 120, which relays the message to the network 119. After receiving the DTAP Connect Acknowledge message 469 at the base station 112, the base station 112 responds with a control traffic acknowledgment (CTACK) message to the URC 104. Thereafter, the call is in progress, and may proceed with the exchange of voice or data communication, depending on the nature of the call, as depicted by the shaded region 475 in FIG. 4B.

Figure 16:
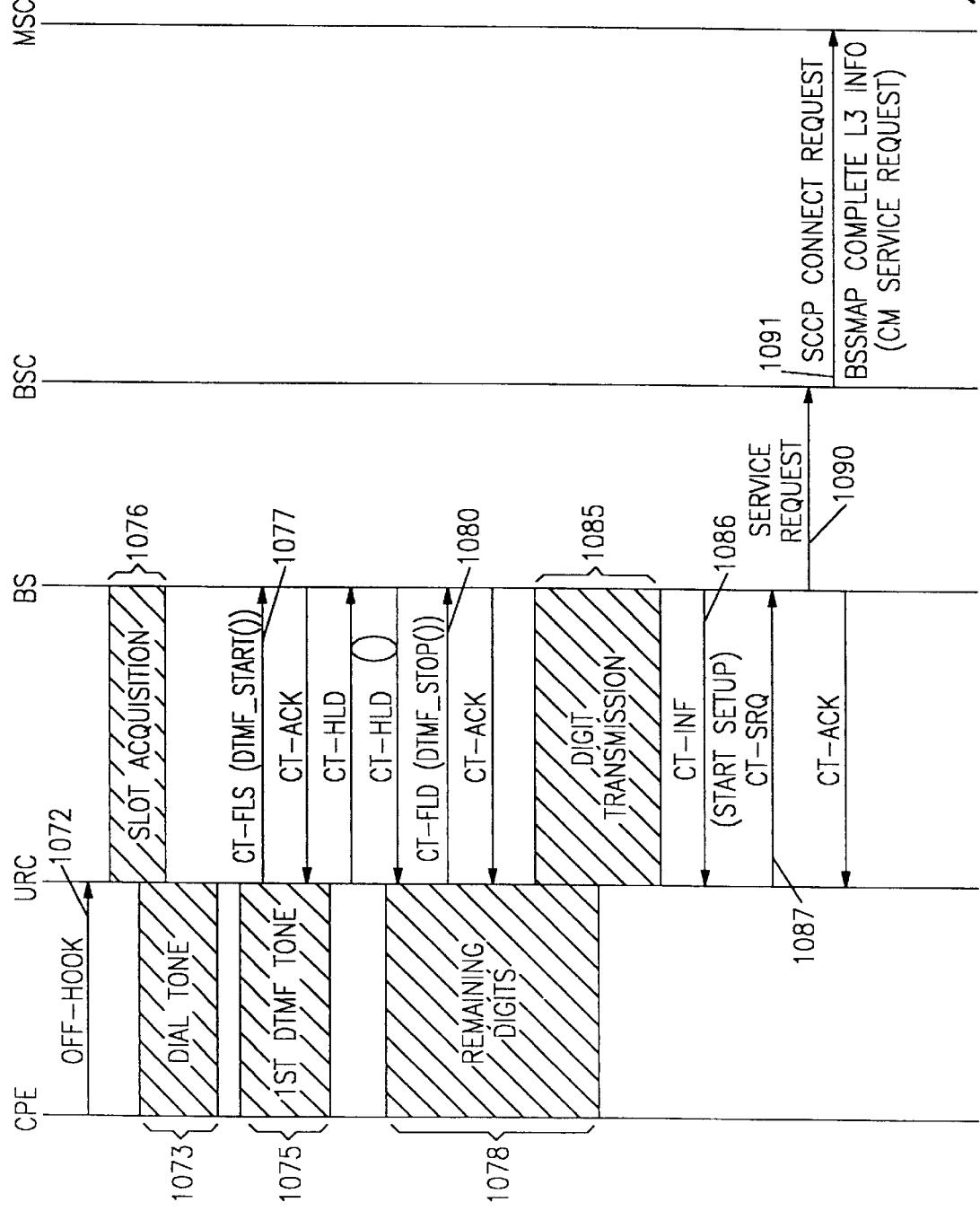
FIG. 16 is an alternative call process flow diagram for setting up a call.

An alternative call flow process for establishing an outgoing call connection is depicted in FIG. 16. In the FIG. 16 call flow process, similar message designations are used as for the call process flow of FIGS. 4A and 4B. The primary difference between the FIG. 16 call flow process and the FIG. 4A–4B call flow process is the timing of the slot acquisition, which occurs prior to receipt of the first dialed number in the FIG. 16 call flow process.

The FIG. 16 call flow process is as follows. After the CPE 105 sends an off-hook signal 1072, the URC 104 immediately attempts to acquire a communication channel (e.g., time slot) as indicated by the shaded region 1076 in FIG. 16. The URC 104 also starts to provide a dial tone to the CPE 104, as reflected by the shaded region 1073 in FIG. 16. The URC 104 then awaits the first dialed digit from the CPE 105. When the URC 104 receives the first dialed number (as detected by the telephone line card module 805), the URC 104 removes the dial tone and, assuming a channel has been successfully acquired, sends a control traffic forward line signal (CT-FLS) message 1077 to the base station 112, bearing a symbol representing the start of a DTMF tone (i.e., DTMF_Start( ) ). The CT-FLS message 1077 preferably includes the appropriate digit as information. In response to the CT-FLS message 1077, the base station 112 transmits a control traffic acknowledgment (CT-ACK) message. The end of the dialed number is indicated by a control traffic CT-FLS message 1080 bearing a symbol DTMF_Stop( ).

The remaining dialed numbers 1078 are transmitted from the URC 104 to the base station 112 substantially as they are received by the URC 104 from the CPE 105, as indicated by the shaded region 1085 in FIG. 16. Call setup then proceeds in a manner similar to FIG. 4A, and continues on in a manner similar to that shown in FIG. 4B.

Figure 5:
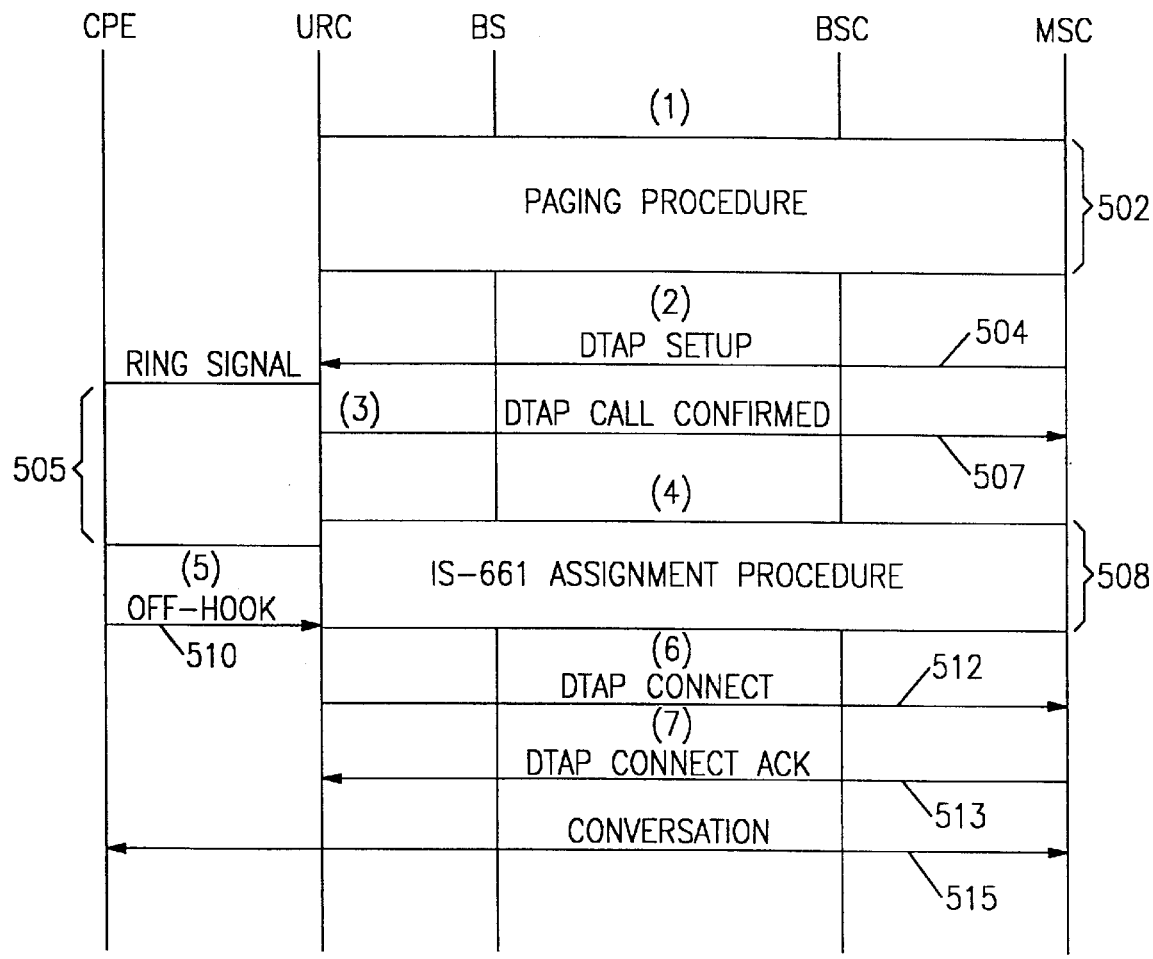
FIG. 5 is a call receiving process flow diagram in accordance with the present invention.

FIGS. 5 through 8 are call flow diagrams illustrating other calling situations besides outgoing calls from the CPE 105. FIG. 5 is a call flow diagram illustrating receipt by the CPE of a call initiated from the network 119. In FIG. 5, for the sake of simplicity, the long arrows extending across one or more communication elements are used as an abbreviation for messages that are transmitted between each element. For example, the DTAP Setup message 504 depicted in FIG. 5 sent from the network switch 120 to the URC 104 represents a DTAP Setup message sent from the network switch 120 to the base station controller 113, from the base station controller 113 to the base station 112, and from the base station 112 to the URC 104.

According to the CPE-terminated call process of FIG. 5, the network switch 120 locates the URC 104 by sending a paging message, as indicated by the shaded region 502 in FIG. 5. The paging message includes an international mobile subscriber identification (IMSI) number for the URC 104. The URC 104 checks the IMSI number in the paging message to see if it matches one of the IMSI numbers associated with the URC 104. If a match is found, the URC 104 responds to the paging message. This procedure results in a signaling link being established between the URC 104 and the network switch 120. The network switch 120 can optionally initiate authentication and ciphering subsequent to the paging procedure, prior to delivering the incoming call to the URC 104.

The network switch 120 delivers the call to the URC 104 by sending a DTAP Setup message 504 to the URC 104. In response to receiving the DTAP Setup message 504, the URC 104 checks the user station ISDN number in the called number identification field of the DTAP Setup message 504 for a match against one if its user station ISDN numbers. If a match is found, the URC 104 proceeds with the call by selecting a free CPE trunk (if more than one CPE trunk is available) and issuing a ring signal (illustrated by shaded region 505) to the CPE 105. Within the URC 104, as depicted in FIG. 11, the OTA processor 810 notifies the power supply and ring current generator 821 that an incoming call has been received, and the power supply and ring current generator 821 signals the telephone line card module 805 to generate a ring signal for the telephone 802. Concurrently, the URC 104 returns a DTAP Call Confirmed message 507 to the network switch 120.

In response to receiving the DTAP Call Confirmed message at the network switch 120, the network switch 120 initiates a resource assignment procedure, illustrated by shaded region 508 in FIG. 5. By this procedure, a speech path (assuming voice data) or other bearer data traffic path is established through the base station 112, base station controller 113 and network switch 120, preferably using an IS-661 ANSI standard resource assignment procedure.

When the URC 104 receives an off-hook signal 510 from the CPE 105, indicating that the call has been answered, the URC 104 attaches its speech path. If the resource assignment procedure is thereby completed, and the URC 104 sends a DTAP Connect message 512 to the network switch 120. In response to receiving the DTAP Connect message 512, the network switch sends a DTAP Connect acknowledge message 513, and the call is thereafter carried out by the exchange of voice or data traffic messages.

Figure 6:
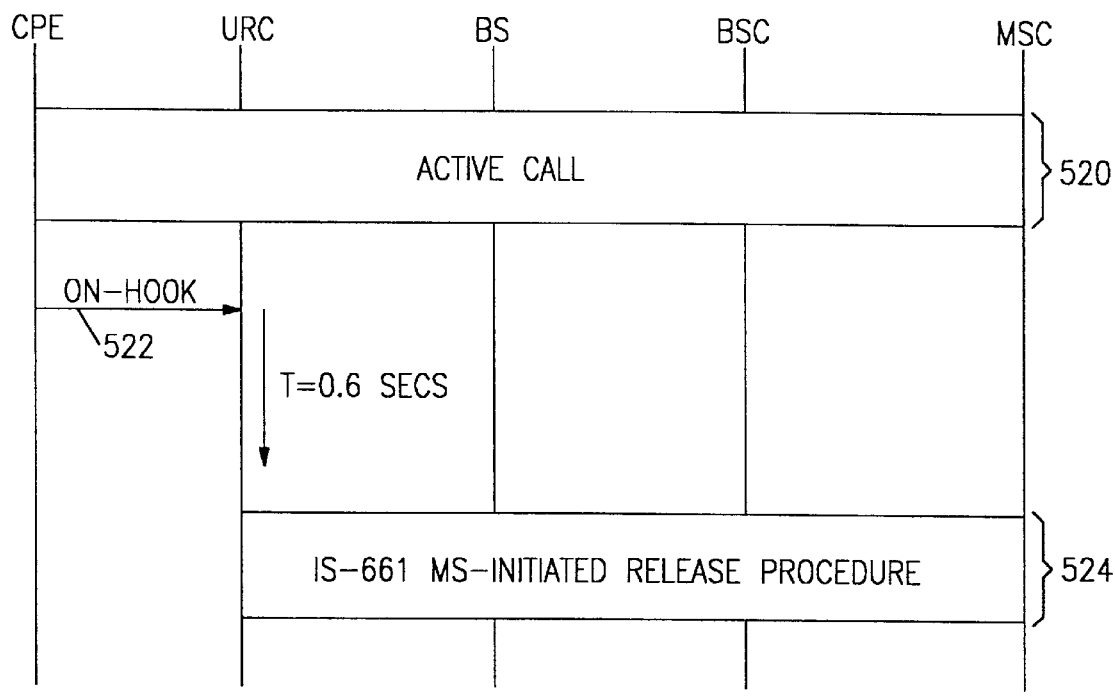
FIG. 6 is a call termination process flow diagram by the end user where the end user is the calling party.
Figure 7:
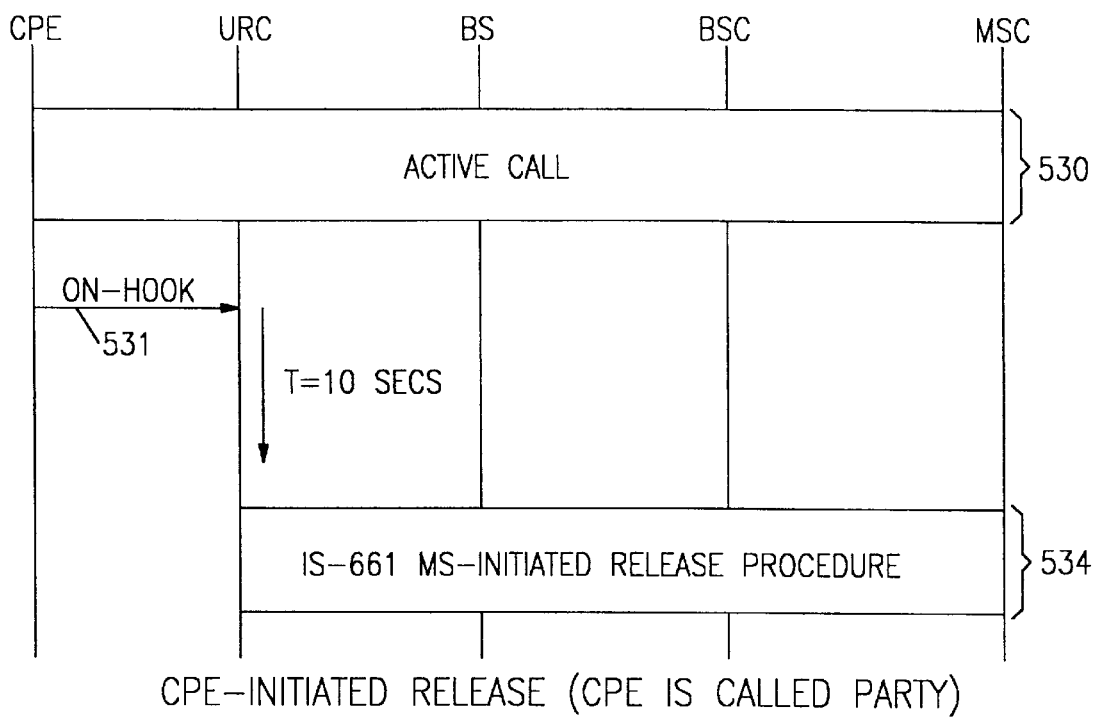
FIG. 7 is a call termination process flow diagram by the end user where the end user is the called party.

FIG. 6 and 7 illustrate exemplary call release procedures. FIG. 6 is a call flow diagram illustrating termination of a call by the standard non-wireless device (i.e., CPE 105) where the end user is the calling party. In FIG. 6, an active call in progress is illustrated by the shaded region 520. A call is terminated by the CPE 105 by sending an on-hook signal 522 to the URC 104. The URC 104 thereafter undertakes an IS-661 ANSI standard call release procedure, illustrated by shaded region 524 in FIG. 6.

FIG. 7 is a call flow diagram illustrating termination of a call by the end user (i.e., CPE 105) similar to the call flow of FIG. 6, except where the end user is the called party instead of the calling party. The call is terminated in the same manner, by sending an on-hook signal 531 from the CPE 105 to the URC 104, except that the URC 104 delays for a longer time before instigating an IS-661 call release procedure.

Figure 8:
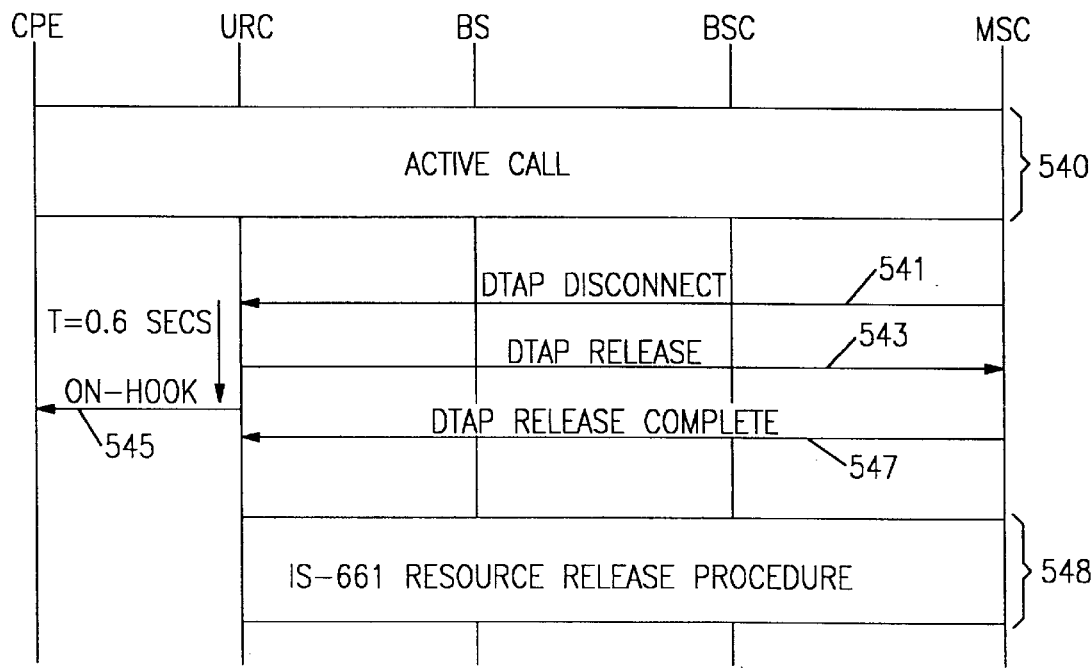
FIG. 8 is a call termination process flow diagram by the network or network switch.

FIG. 8 is a call flow diagram illustrating termination of a call by other than the CPE 105. In FIG. 8, an active call in progress is illustrated by shaded region 540. A DTAP Disconnect message 541 is transmitted from the network switch 120 to the URC 104. The URC 104 responds thereto with a DTAP release message 543. About 0.6 seconds after receiving the DTAP disconnect message 541, the URC 104 sends an on-hook message 545 to the CPE 105. The URC 104 then awaits the receipt of a DTAP Release Complete message 547 from the network switch 120. After receipt of the DTAP Release Complete message 547, the process continues with an IS-661 call release procedure, as illustrated by shaded area 548 in FIG. 8.

It may be advantageous in some embodiments to provide for emergency call processing where needed. For example, governmental regulations may require that one or more communication channels of a base station 112 be reserved for emergency calls. The emergency call channels are only accessible if the calling party indicates the emergency status of its call to the base station 112.

In one embodiment including means for emergency call processing, the URC 104 comprises an emergency call digit analyzer to determine whether an emergency call is being placed. The emergency digit analyzer may interface with or be embodied within, for example, the telephone line card module 805, the OTA processor 810 or the transceiver 812 of the URC 104 depicted in FIG. 11.

Figure 12:
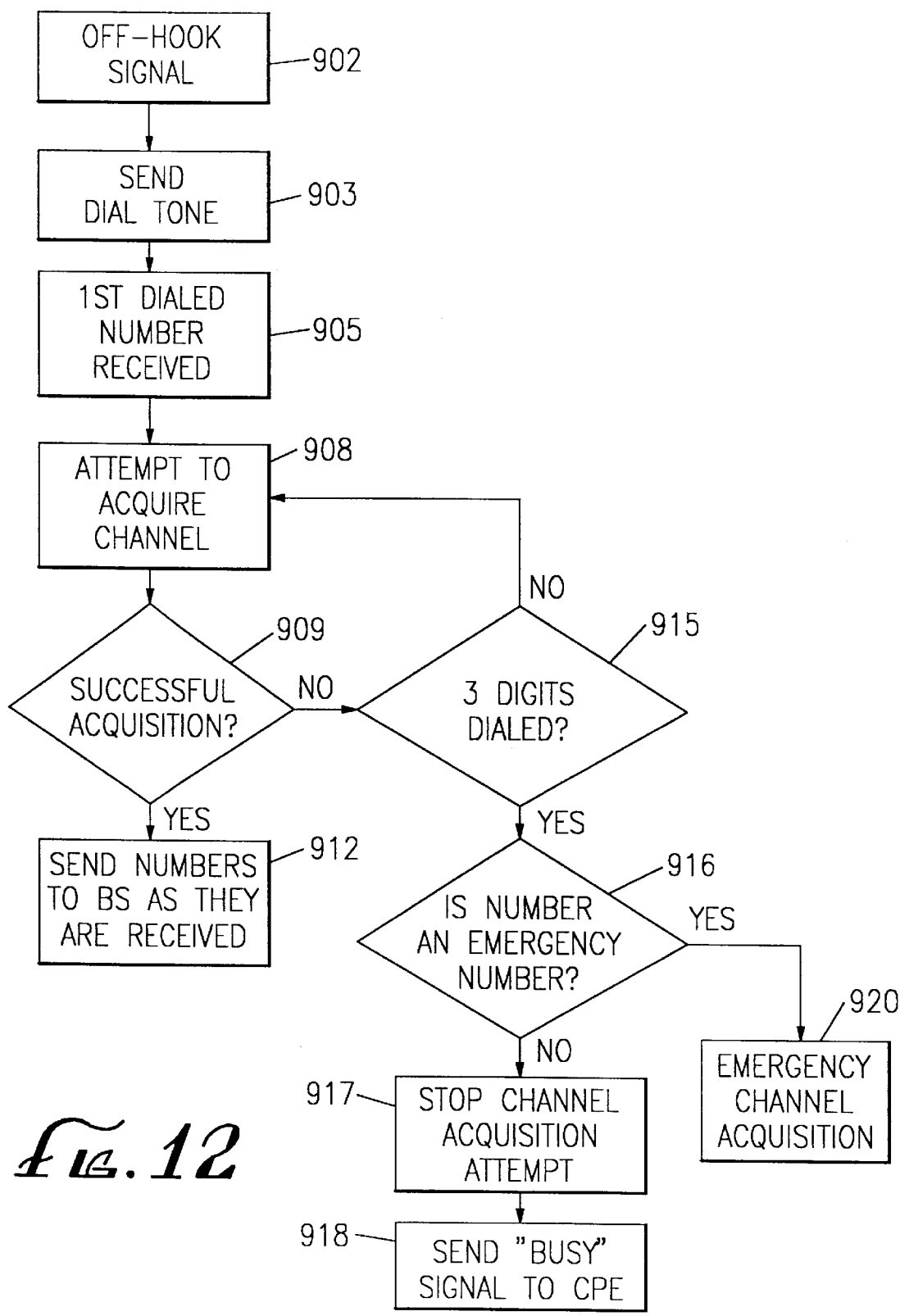
FIG. 12 is a flow chart of a call processing routine including the ability to accommodate emergency calls initiated by the end user.

FIG. 12 depicts a flow chart for initiation of communication accommodating emergency call processing, such as prioritized routing of "911" calls. According to the FIG. 12 flow chart, the CPE 105 sends an off-hook signal in a first step 902, to which the URC 104 responds with provision of a dial tone in a following step 903. The CPE 105 sends a first dialed number to the URC 104 in step 905. The URC 104 at step 908 attempts to acquire a communication channel after receiving the first dialed number from the CPE 105. If successful, as tested in decision step 909, then, as reflected in step 912, the URC 104 continues to transmit dialed numbers to the base station 112 substantially at the same time as they are received from the CPE 105.

While channel acquisition is attempted, the URC 104 continues to receive dialed numbers from the CPE 105. After an unsuccessful channel acquisition attempt, in a next step 915, the URC 104 tests to see if the amount of dialed numbers needed for an emergency code number have been received (e.g., for "911" the digit analyzer in the URC 104 tests to see if three digits have been received). If not, then the process returns to step 908 and the URC 104 continues to attempt to acquire a normal communication channel. If, however, the amount of dialed numbers needed for an emergency call (e.g., three digits) have been received by the URC 104, as tested in decision step 915, then the process moves to decision step 916, wherein the actual numbers received are tested against the emergency number code. If they match, the URC 104 makes an emergency channel acquisition in step 920 (preferably over a communication channel expressly reserved for emergency calls). If not, then the call acquisition process terminates after a timeout period $T_0$. Once emergency call status has been determined, the URC 104 continues attempting to make an emergency call connection through an emergency channel acquisition, until successful or until the CPE 105 goes on-hook.

Figure 14:
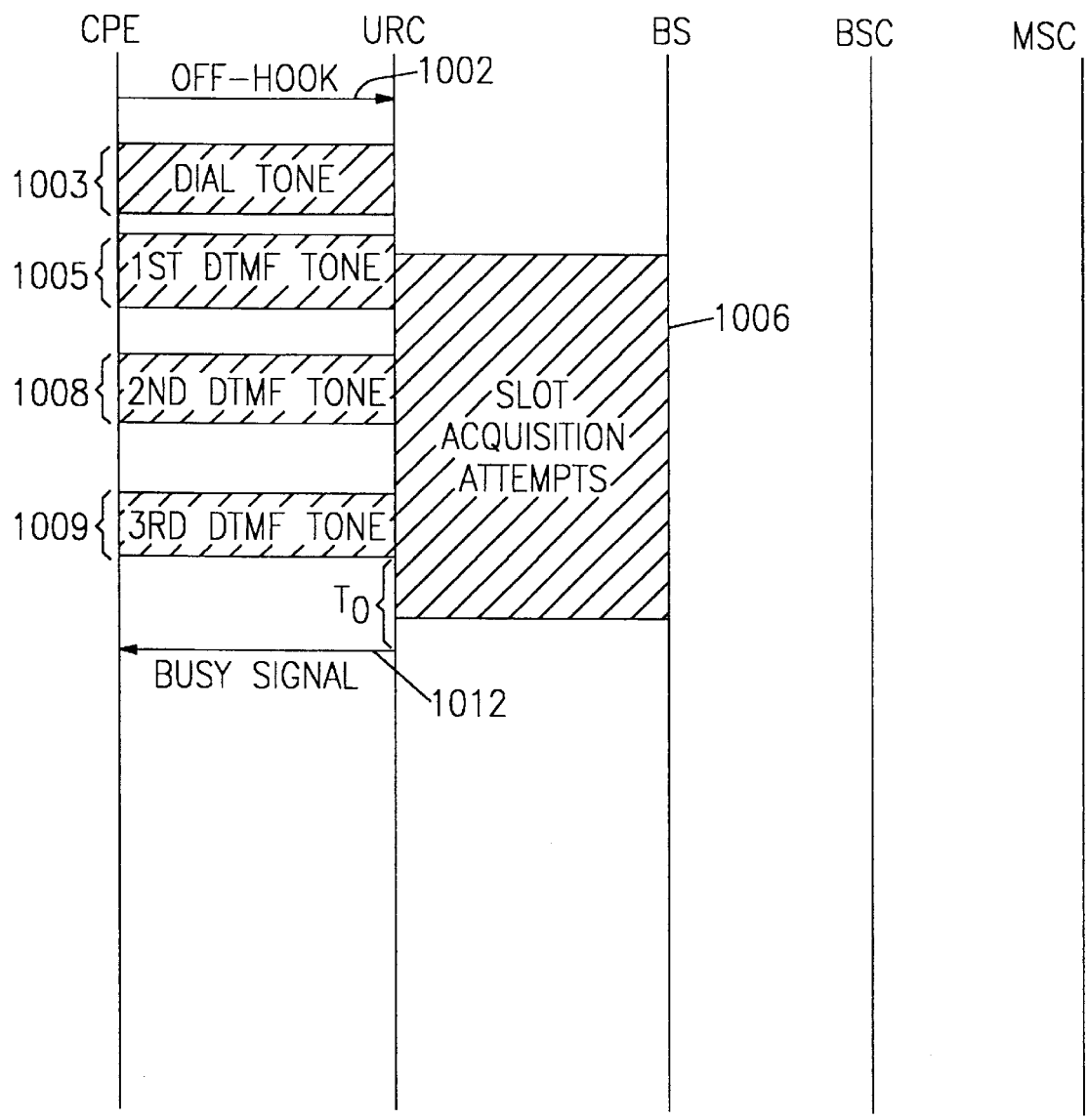
FIG. 14 is a call process flow diagram for a non-emergency call when no normal channels are available.
Figure 15:
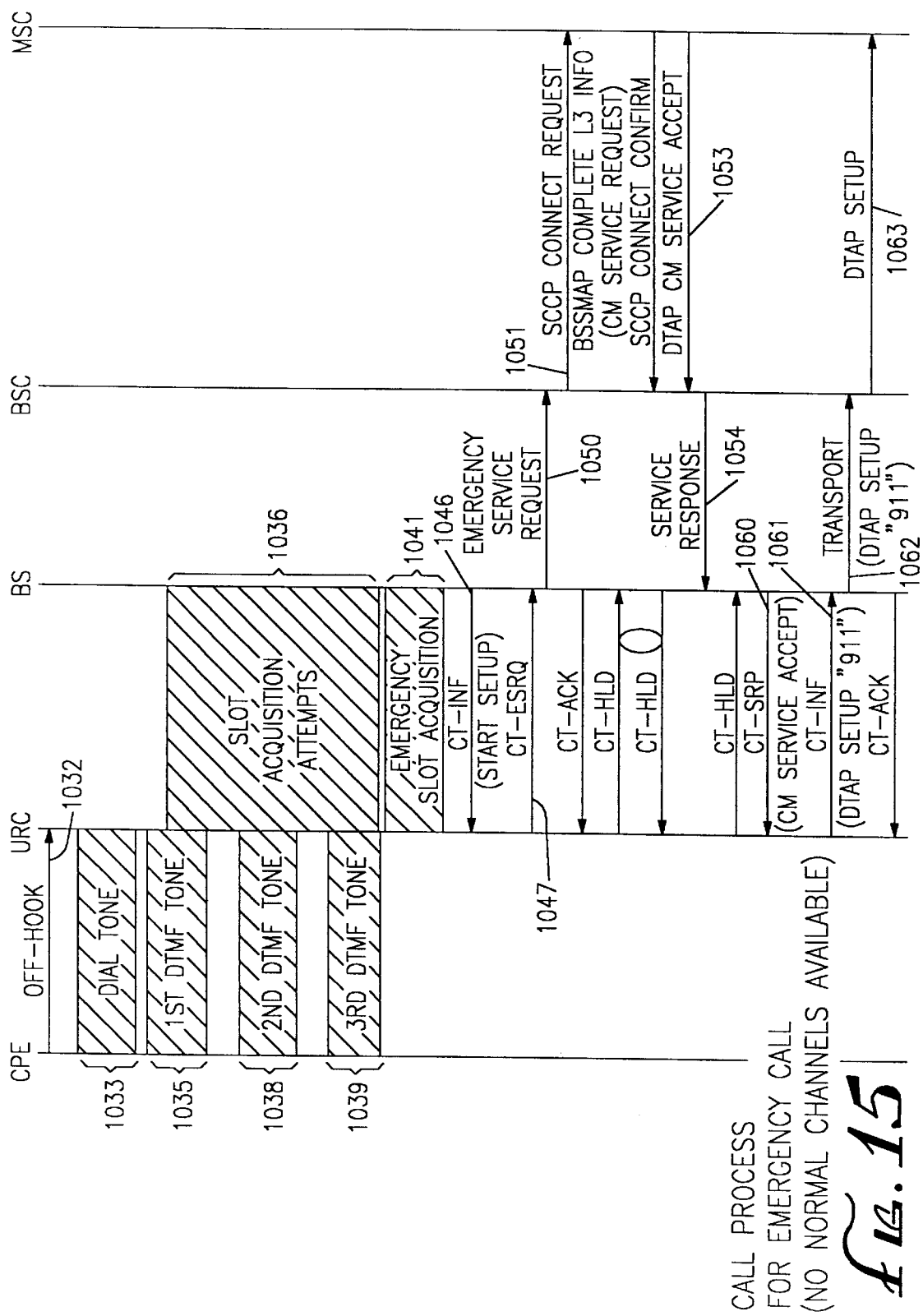
FIG. 15 is a call process flow diagram for an emergency call when no normal channels are available, according to one illustrative embodiment of the invention.

FIGS. 14 and 15 are call process flow diagrams illustrating operation of a particular embodiment of the invention when no normal communication channels are available, with the FIG. 14 call process flow diagram illustrating the case where a non-emergency call is attempted, and the FIG. 15 call process flow diagram illustrating the case where an emergency call is attempted. In FIG. 14, the URC 104 receives an off-hook signal 1002 and responds by providing a dial tone 1003. Upon receiving the first dialed number 1005, the URC 104 attempts to acquire a communication channel, as illustrated by the shaded region 1006 in FIG. 14. While attempting to acquire a communication channel, the URC 104 continues to receive a second dialed number 1008 and a third dialed number 1009. After receiving the third dialed number 1009, assuming the local emergency numbering scheme defines a three-digit emergency number code, the URC 104 determines whether or not an emergency number code has been dialed. If an emergency number code has not been dialed, then the URC 104 stops attempting to acquire a communication channel after a timeout period To following the third dialed number 1009, and sends a busy signal 1012 to the CPE 105 indicating that the base station 112 is not available.

The FIG. 15 call process flow illustrates the case where an emergency call is attempted. In FIG. 15, similar to FIG. 14, the URC 104 receives an off-hook signal 1032, responds with a dial tone 1033, and, upon receiving the first dialed number 1035, attempts to acquire a communication channel, as illustrated by the shaded region 1036 in FIG. 15. While attempting to acquire a communication channel, the URC 104 continues to receive a second dialed number 1038 and a third dialed number 1039. After receiving the third dialed number 1039, assuming the local emergency numbering scheme defines a three-digit emergency number code, the URC 104 determines whether or not an emergency number code has been dialed. If an emergency number code has been dialed, then the URC 104 makes an emergency communication channel acquisition, as represented by the shaded region 1041 in FIG. 15, preferably over a communication channel expressly reserved for emergency calls. The URC 104 does this by transmitting an emergency call signal to the base station 112 over the reserved emergency call channel. When the base station 112 receives the emergency call signal over the emergency call channel, it knows that an emergency call is being placed, and so the particular emergency number code digits need not be transmitted to the base station 112 from the URC 104 (although they may be so transmitted in some embodiments, if desired).

The base station 112 responds with a control traffic information (CT-INF) message 1046, informing the URC 104 that call setup may being. In response to the CT-INF message 1046, the URC 104 sends a control traffic emergency service request (CT-ESRQ) message 1047 to the base station 112, which forwards the service request to the MSC 120 by way of the base station controller 113. The base station controller 113 sends a SCCP Connect Request message 1051 comprising a BSSMAP CM service request message indicating an emergency call is being made.

The MSC 120 responds with a DTAP CM Service Accept message 1053 (or a non-GSM equivalent) to the base station controller 113, when in turn sends a Service Response message 1054 to the base station 112. The base station 112 then sends a CT-SRP message 1060 comprising a CM Service Accept message to the URC 104, thereby completing the mobility management setup. The URC 104 response with a CT-INF message 1061 comprising a DTAP Setup message including the emergency digits of the local numbering scheme. The digits for the emergency number code according to the local numbering scheme are preferably stored in the base station 112, but alternatively may be received from the URC 104, and the base station 112 sends the emergency number code digits (e.g., "911") to the MSC 120 as part of the DTAP setup procedure. For non-GSM embodiments, the actual emergency digits may or may not need to be sent to the MSC 120 as part of the emergency call setup. After receiving the DTAP Setup message 1061 from the URC 104, the base station 112 sends a Transport message 1062 comprising a DTAP Setup message (including the emergency number code digits) to the base station controller 113, which forwards the DTAP setup message to the MSC 120. The call process flow then proceeds in a manner similar to FIG. 4B as for ordinary calls.

Figure 13:
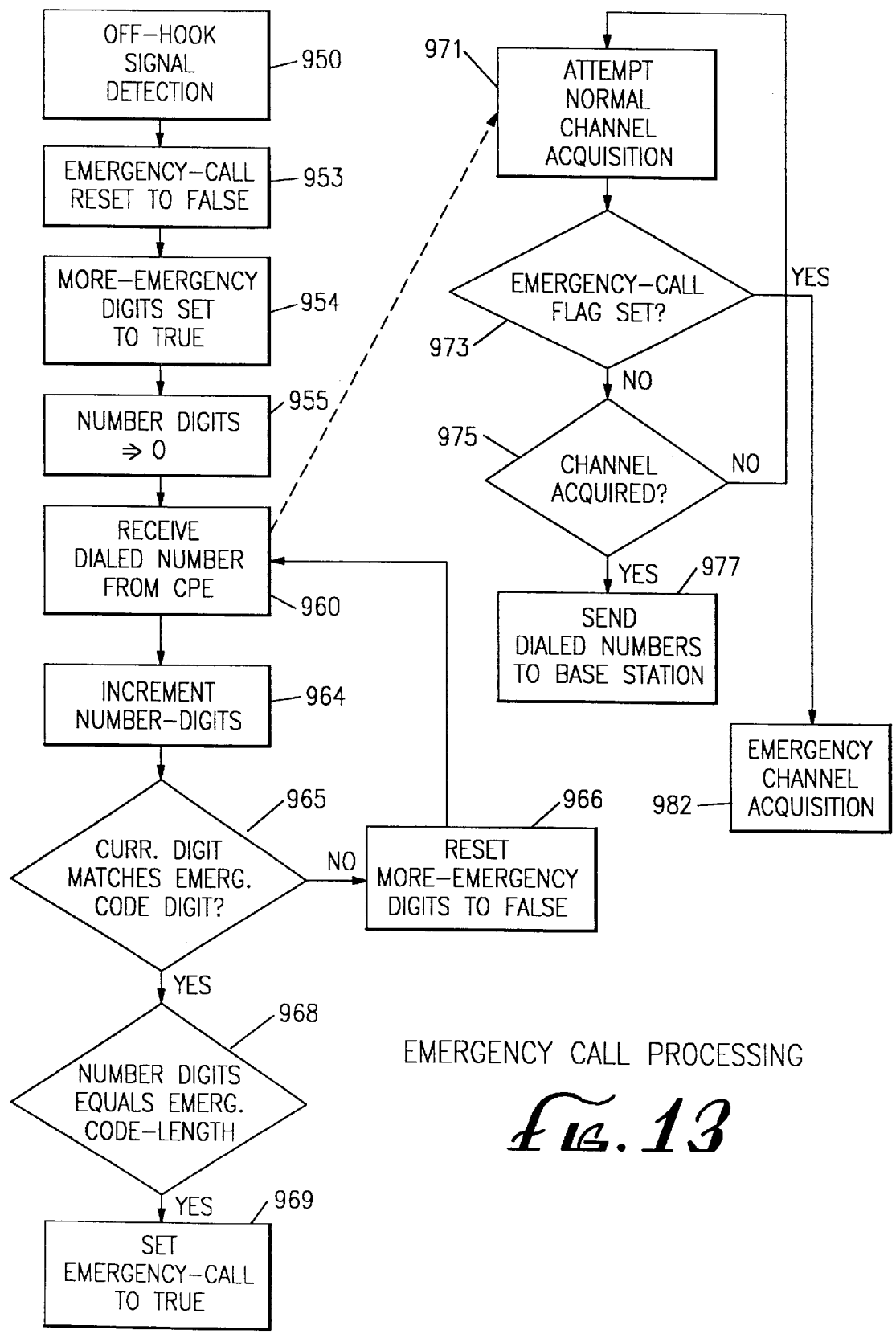
FIG. 13 is another flow chart of a preferred call processing routine including the capability for handling emergency calls initiated by the end user.

FIG. 13 is a flow chart setting out exemplary steps for carrying out emergency call processing in accordance with one embodiment of the invention. In conjunction with the FIG. 13 flow chart are used several flags and parameters internal to the URC 104, including the flags EMERGENCY_CALL and MORE_EMERGENCY_DIGITS, and the parameters NUMBER_DIGITS and EMERGENCY_CODE_LENGTH. Generally, NUMBER_DIGITS is a variable representing the number of dialed numbers received from the CPE 105, EMERGENCY_CODE_LENGTH is a constant representing the length of the emergency number code for the locality in which the URC 104 is deployed, MORE_EMERGENCY_DIGITS is a flag that when true indicates all of the previously received dialed numbers for the present call have matched the emergency number code, EMERGENCY_CALL is a flag set when an emergency call has been received from the CPE 105 and determined as such by the URC 104.

According to the FIG. 13 flow chart, when an off-hook signal is received from the CPE 105 in step 950, the flag EMERGENCY_CALL is reset to FALSE, and the MORE_EMERGENCY_DIGITS flag is set to TRUE (indicating that thus far no non-emergency dialed numbers have been received), as reflected in steps 953 and 954. These flags generally indicate, respectively, that no emergency call has been detected yet, and that more digits of the emergency number code are possible. The NUMBER_DIGITS counter is reset to zero, as indicated in step 955. The EMERGENCY_CODE_LENGTH parameter is defined by the number of digits in the emergency number code for the particular locality in which the URC 104 is deployed (e.g., is set to three where the local emergency number is "911"), and is a constant that need not be reset for each call.

For each dialed number received at the URC 104 from the CPE 105, so long as a communication channel has not yet been acquired, the URC 104 initiates a loop commencing at step 960 in the FIG. 13 flow chart. First, in the decision step 962, if the MORE_EMERGENCY_DIGITS flag is not set, then the URC 104 does no further emergency call processing, and call processing continues by cycling back to step 960.

However, if the MORE_EMERGENCY_DIGITS flag is set (as it is, e.g., when the off-hook signal is detected), then the URC 104 increments NUMBER_DIGITS in step 964 and tests the current received dialed number in step 965 to see if it matches the digit in the same location of the emergency number code (by using NUMBER_DIGITS as a pointer). For example, if NUMBER_DIGITS is two, then the URC 104 looks to the second digit in the emergency number code to compare it against the current dialed number. If the current dialed number does not match the corresponding digit of the emergency number code, then MORE_EMERGENCY_DIGITS is reset to FALSE in step 966, and the emergency call processing is complete for the particular call. The logic flow then proceeds back to step 960 and will cycle through the remaining dialed numbers until all of the dialed numbers are received (or until timeout period To expires if no communication channels are available after the third digit has been received).

If, however, the current dialed number matches the corresponding emergency number code digit, then the URC 104 tests NUMBER_DIGITS against the EMERGENCY_CODE_LENGTH in step 968. If NUMBER_DIGITS equals EMERGENCY_CODE_LENGTH, then all the digits of the emergency number code have been received, and an emergency call is being transmitted from the CPE 105 The EMERGENCY_CALL flag is then set to TRUE in step 969. If, on the other hand, NUMBER_DIGITS does not equal EMERGENCY_CODE_LENGTH at that point, then some but not all of the emergency number code digits have been received, and emergency call processing continues until either the complete emergency number code is received, or a non-emergency number code digit is received. The logic flow returns to step 960 so that more dialed numbers may be acquired.

After the first dialed number is received in step 960, the OTA processor 810 (see FIG. 11) of the URC 104 attempts to acquire a communication channel with a local base station 112. If the EMERGENCY_CALL flag should be set before a communication channel is acquired, as tested in step 973, then the channel acquisition logic branches to step 982, whereby an emergency channel acquisition is made. If the EMERGENCY_CALL flag is not set, then the OTA processor 810 of the URC 104 continues to attempt to acquire a normal communication channel. If a normal communication channel is acquired, then, as reflected in step 977, the OTA processor 810 starts sending the dialed numbers to the base station 112 substantially at the same time as the dialed numbers are received.

An example of an emergency call handling routine will be explained for the emergency number code "911". When the first dialed number is received at the URC 104 in step 960, the URC 104 increments the NUMBER_DIGITS counter to one in step 964. The first dialed number received at the URC 104 is compared with a stored value of the first digit of the number 965. If they do not match, the RESET_MORE_EMERGENCY flag is set to FALSE 966 and the emergency call processing is stopped at this time. In our example the first digit dialed is "9" which matches the first digit of the emergency number. In this situation, the NUMBER_DIGITS is tested against the EMERGENCY_CODE_LENGTH (which is 3 for the emergency number code "911") 968. Since the number of dialed numbers received at this point is one and the emergency number code length is three, the URC 104 continues its attempts to set up a normal communication channel in step 971.

When the second dialed number ("1") of the "911" emergency number code is received in step 960, NUMBER_DIGITS is incremented to two in step 962 and the URC 104 now compares the current received dialed number against the second digit of the emergency number code in step 965. As described above, if the numbers are different the MORE_EMERGENCY_DIGITS flag is set to zero 966. If the number matches, the NUMBER_DIGITS is compared to the EMERGENCY_CODE_LENGTH. Because the amount of dialed numbers received at this point is two and the emergency number code length is three in our example, no emergency call is yet declared. The URC 104 therefore continues to attempt to set up a normal communication channel for the time being in step 971 (assuming it has not already succeeded at setting up a normal communication channel).

When the third dialed number ("1") of the "911" emergency number code is received in step 960, NUMBER_DIGITS is incremented from two to three in step 964 and the URC 104 now matches the current received dialed number against the third digit of the emergency number code in step 965. Because the amount of dialed numbers received at this point is three and the emergency number code length is three, as tested in step 968, an emergency call is being transmitted from the CPE 105, and the EMERGENCY_CALL flag is set to TRUE in 969. The URC 104 therefore transmits an emergency call signal to establish an emergency call channel (in step 982).

If any of the first three digits are not 9-1-1 (in that order), then MORE_EMERGENCY_DIGITS will be reset to FALSE in step 966, thereby ending the emergency call process handling for the particular call in question.

When an emergency number code is received by the URC 104, the URC 104 emergency call handling logic sets the flag EMERGENCY_CALL which causes the URC 104 to transmit an emergency call signal to acquire a communication channel. The URC 104 thereby indicates to the base station 112 that its call is an emergency call (e.g., a "911" call), and the base station 112 gives special priority to the call. In one embodiment, the DTAP Setup message sent from the URC 104 to the base station 112 includes a message indicating whether or not the present call is an emergency call, depending on the value of the EMERGENCY_CALL flag of the URC 104.

The emergency number code can be set in the URC 104 in any of a variety of manners. The emergency number code can be set, for example, by manual switches external to the URC 104. The number of switches provided may be the maximum length of any of the emergency codes for the localities in which the URC 104 is expected to be deployed. Each manual switch is used to select one digit of the emergency number code. Where more manual switches are provided than emergency code digits for the particular locality, the later digit or digits can be set to a non-numeric indicator (i.e., an "X") indicating that no further digits are used as part of the emergency number code.

Alternatively, the emergency number code and/or emergency call processing logic can be programmed into the URC 104, and may be resident on a dedicated integrated chip that may be easily substituted depending upon the locality in which the URC 104 is deployed. Programming of the URC 104 may particularly be desirable where more than one emergency call code is expected to be used in one or more localities in which the URC 104 will be deployed.

Time slot acquisition to establish an over-the-air communication channel in accordance with the over-the-air timing structure of FIG. 9A, as generally referenced, for example, in the FIG. 4A call flow diagram and at various points elsewhere, will now be described in more detail.

The URC 104 preferably initiates communication with a base station 112 according to techniques described in, for example, U.S. Pat. No. 5,455,822, hereby incorporated by reference as if set forth fully herein. Preferably, during at least one of the base transmit frames 625 of a time slot 602 (and preferably for each free time slot 602 in the polling loop 601), the base station 112 transmits a general poll signal, indicating which, if any, time slots 602 are currently unassigned and therefore available for communication with a user station.

The particular user station (e.g., URC 104) seeking to establish a communication link acquires a time slot 602 for communication with the base station 112 by monitoring the polling loop 601 for the base station general poll signal. Upon detecting the general poll, the user station, depending upon the information contained in the general poll signal, transmits during the user station transmit frame 610 of an available time slot 602 a general poll response signal. The general poll response signal indicates a desire to establish communication with the base station 112 and identifies the particular user station by including, for example, a unique ID number corresponding to that particular user station. The general poll response signal also provides information for sounding the available communication links between the base station 112 and the user station.

The general poll response is preferably received by the base station 112 during the mobile station transmit frame 610 of the time slot 602. The base station antennas each receive the user station transmission and preferably provide channel characterization information to a processor in one or more radios 707 (see FIG. 10) in the base station 112 during the mobile station transmit frame 610. Each base station radio 707 preferably also stores the data (including the channel characterization information) in a data buffer. The base station 112 preferably processes the channel characterization information during the guard interval 620 and chooses the radio 707 which exhibited the best channel characterization quality metrics.

Based upon the channel characterization information, the base station 112 selects an antenna and transmit power level for use in transmitting the base station transmission during the base transmit frame 625 in a time slot 602. In response to the general poll response signal, the base station 112 preferably transmits a specific poll signal including identification information corresponding to the particular user station desiring to acquire the particular time slot 602. The user station can respond to the specific poll signal with a specific response signal in the user transmit frame 610 of the appropriate time slot 602, or can start exchanging control and/or data traffic messages over an established communication link.

Embodiments of the invention have sometimes been described herein with reference to a dedicated URC 104 for a single user 105. The principles of the invention can also be applied to connecting a URC (such as the URC depicted in FIG. 11) to a private branch exchange network ("PBX"), key system, or other local area private network, thereby providing wireless communication access to the users of the private network. The PBX or key system may be connected to one or more telephones, computers, facsimile machines or other devices, each preferably using an RJ-11 interface. Also, more than one URC may be connected to a single PBX or private network, depending on system needs.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A method for establishing communication comprising the steps of:

receiving at a universal radio converter (URC) signals from a standard non-wireless device seeking to establish communication over a network, said signals comprising information indicative of numbers of a destination phone number;

establishing a wireless communication link from said URC to a base station after receiving at least one of said signals;

transmitting from said URC to said base station, over said wireless communication link, digitized signals corresponding to said signals substantially at the same time as said signals are received at said URC;

receiving said digitized signals at said base station and determining when the digitized signal corresponding to the last number of the destination phone number is received; and sending said destination phone number information to said network in conjunction with a call setup request.

2. The method of claim 1 wherein said wireless communication link comprises a TDMA channel.

3. The method of claim 1 wherein said network comprises a GSM network.

4. The method of claim 1 further comprising the step of detecting an emergency call request at said URC in response to receiving said signals, and initiating an emergency wireless channel acquisition in response to detecting said emergency call request.

5. A system for setting up a call over a communication path having at least one wireless link, said system comprising:

a standard non-wireless device;

a universal radio converter (URC) coupled to said standard non-wireless device, said URC receiving from said standard non-wireless device, when said standard non-wireless device desires to originate a call, signals indicative of digits in a destination telephone number;

a base station accessible to said URC over a wireless communication link, said base station receiving digits from said URC over said wireless communication link and analyzing said digits according to a call numbering format compatible with a telephone network;

a call setup message output from said base station, said call setup message comprising said destination telephone number; and a network switch coupled to said base station, said network switch receiving said call setup message and conveying it to said network.

6. The system of claim 5 further comprising a base station controller coupled between said base station and said network switch.

7. The system of claim 5 wherein said wireless communication link is a TDMA communication link.

8. The system of claim 5 wherein said network is a GSM network.

9. The system of claim 5 wherein said URC comprises means for detecting an emergency call request from said standard non-wireless device and initiating an emergency call setup procedure in response thereto.

10. A method for call setup comprising the steps of:

receiving at a base station a request from a universal radio converter (URC) to establish a wireless communication link;

establishing a wireless communication link between said base station and said URC in response to said request;

periodically receiving at said base station, over said wireless communication link, a plurality of dialed numbers from said URC, said dialed numbers received from a standard non-wireless device seeking to establish a call using said base station;

determining at said base station that enough dialed numbers have been received to construct a number sequence according to a local call numbering format; and sending a call setup request message from said base station to a network, said call setup request message including said number sequence.

11. The method of claim 10 wherein said wireless communication link comprises a TDMA communication link.

12. The method of claim 10 wherein said network is a GSM network.

13. A base station comprising:

a first processor capable of supporting wireless communication with at least one standard non-wireless device;

a second processor coupled to a network switch;

a first controller coupled to said first processor;

a memory coupled to said first controller, wherein dialed numbers indicative of a destination phone number transmitted from a standard non-wireless device to said first processor are stored, said first controller comprising means for analyzing said dialed numbers according to a local numbering format; and a second controller coupled to said second processor and to said memory, said second controller comprising means for constructing a call setup request.

14. The base station of claim 13 wherein said second processor is coupled to a base station controller, and said base station controller is coupled to a network switch.

15. The base station of claim 13 wherein said first processor transmits and receives messages using time division multiple access communication.

16. A method of call setup comprising the steps of:

receiving, at a universal radio converter (URC), tone signals indicative of digits of a phone number;

upon receiving a first tone signal, establishing a wireless communication link with a base station;

digitally encoding said tone signals at said URC, thereby generating URC digit messages;

periodically transmitting said URC digit messages from said URC to said base station over said wireless communication link;

receiving a start setup message at said URC from said base station; and in response to said start setup message, transmitting a call setup message from said URC to said base station.

17. The method of claim 16 wherein said wireless communication link comprises a TDMA communication link.

18. The method of claim 16 further comprising the steps of receiving said URC digit messages at said base station;

constructing a number sequence based on information contained in said URC digit messages according to a local call numbering format;

when said number sequence contains enough digits to satisfy said local call numbering format, transmitting said start setup message from said base station to said URC; and in response to receiving said call setup message from said URC, transmitting a base station call setup message to a network, said base station call setup message comprising said number sequence.

19. The method of claim 16 further comprising the steps of detecting, in response to said tone signals, an emergency call request at said URC.

20. An apparatus comprising a telephone line card module capable of coupling to a standard non-wireless device over an analog interface and receiving tone signals thereover;

a transceiver;

an over-the-air processor coupled to said transceiver and to said telephone line card module, said over-the-air processor adapted to establish a wireless communication link with a base station when said telephone line card module receives a first tone signal over said analog interface, and to send tone signals received by said telephone line card module from said standard non-wireless device to said base station in digitally encoded form over said wireless communication link using said transceiver.

21. The apparatus of claim 20 wherein said over-the-air processor comprises a TDMA processor.

22. The apparatus of claim 20 further comprising means for detecting an emergency call request from said standard non-wireless device in response to said first tone signal.

23. A method for setting up a call over a communication path comprising at least one wireless communication link, said method comprising the steps of:

periodically receiving signals representing digits at a universal radio converter (URC) from a device seeking to establish communication over a wireless communication link;

in response to a first one of said signals, attempting to establish a wireless communication link between said URC and a base station;

determining whether or not an emergency call condition exists based on an initial string of said digits;

if an emergency call condition exists, then establishing an emergency wireless communication link between said URC and said base station and completing an emergency call thereover;

if no emergency call condition exists, then performing the steps of
converting said signals into digital signals,
transmitting said digital signals from said URC to said base station over said wireless communication link;
receiving said digital signals at said base station;
formatting a call setup request at said base station; and
sending said call setup request from said base station to a network.

24. The method of claim 23 wherein said wireless communication link comprises a TDMA communication link.

25. The method of claim 23 wherein said network comprises a GSM network.

26. A system for call setup comprising a base station;

a network coupled to said base station;

a universal radio converter (URC) comprising
a telephone line card module adapted to receive tone signals over an analog interface from a standard non-wireless device,
an over-the-air processor, and
a transceiver;

said URC comprising means to establish a wireless communication link from said URC to said base station upon receiving a first tone signal over said analog interface from said standard non-wireless device, and for establishing an emergency wireless communication link upon receiving a series of tone signals over said analog interface from said standard non-wireless device indicating an emergency call request.

27. The system of claim 26 wherein said over-the-air processor comprises a TDMA processor.

28. A method for setting up a call over a communication path comprising at least one wireless communication link, said method comprising the steps of:

receiving a first dialed number at a universal radio converter (URC) from a device seeking to establish communication over a wireless communication link;

establishing a wireless communication link between said URC and a base station in response to receiving said first dialed number at said URC;

transmitting said first dialed number from said URC to said base station over said wireless communication link;

receiving said first dialed number at said base station;

receiving additional dialed numbers at said URC from said device seeking to establish communication over a wireless communication link;

transmitting said additional dialed numbers from said URC to said base station over said wireless communication link;

receiving said additional dialed numbers at said base station;

formatting a call setup request at said base station; and sending said call setup request from said base station to a network.

29. The method of claim 28 further comprising the steps of detecting an emergency call condition at said URC in response to receiving emergency call number digits from said device seeking to establish communication over said wireless communication link, and transmitting an emergency call signal from said URC to said base station over said wireless communication link.

30. The method of claim 28 wherein said wireless communication link comprises a TDMA communication link.

31. The method of claim 28 wherein said network comprises a GSM network.

* * * * *

Disclaimer 5,884,148—Murat I. Bilgic; Narayan P. Menon both of Colorado Springs, Colo. WIRELESS LOCAL LOOP SYSTEM AND METHOD. Patent dated March 16, 1999. Disclaimer filed by the assignee, Opuswave Networks, Inc.

Hereby disclaims and dedicates to the Public all claims and entire term of said patent.
*(Official Gazette, August 20, 2002)*